United States Patent
Yang et al.

(10) Patent No.: US 11,751,256 B2
(45) Date of Patent: *Sep. 5, 2023

(54) METHOD FOR TRANSMITTING AND RECEIVING SIGNAL IN WIRELESS COMMUNICATION SYSTEM SUPPORTING UNLICENSED BAND, AND APPARATUS SUPPORTING SAME

(71) Applicant: LG ELECTRONICS INC., Seoul (KR)

(72) Inventors: Suckchel Yang, Seoul (KR); Seonwook Kim, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,440

(22) Filed: Oct. 14, 2022

(65) Prior Publication Data
US 2023/0038123 A1    Feb. 9, 2023

Related U.S. Application Data

(63) Continuation of application No. 16/976,214, filed as application No. PCT/KR2019/004099 on Apr. 5, 2019, now Pat. No. 11,503,650.

(30) Foreign Application Priority Data

Apr. 5, 2018 (KR) .................. 10-2018-0039483
Sep. 27, 2018 (KR) .................. 10-2018-0115389
Jan. 11, 2019 (KR) .................. 10-2019-0004177

(51) Int. Cl.
*H04W 74/08* (2009.01)
*H04W 56/00* (2009.01)
(Continued)

(52) U.S. Cl.
CPC ..... *H04W 74/0833* (2013.01); *H04W 56/001* (2013.01); *H04W 72/0453* (2013.01);
(Continued)

(58) Field of Classification Search
CPC ........... H04W 74/0833; H04W 56/001; H04W 72/042; H04W 72/0453; H04W 72/0493; H04W 74/006; H04W 74/0808
See application file for complete search history.

(56) References Cited

U.S. PATENT DOCUMENTS

2007/0248176 A1    10/2007  Miyoshi
2014/0355557 A1*  12/2014  Peng .................. H04W 16/14
                                                                          370/330
(Continued)

FOREIGN PATENT DOCUMENTS

KR    1020150020084 A    2/2015
KR    1020180026539 A    3/2018
(Continued)

OTHER PUBLICATIONS

Samsung, "Discussion on random access procedure for eLAA", 3GPP TSG RAN WG1 Meeting #85, May 23-27, 2016, R1-164749.
(Continued)

*Primary Examiner* — Brian D Nguyen
(74) *Attorney, Agent, or Firm* — BRYAN CAVE LEIGHTON PAISNER LLP

(57) ABSTRACT

The present disclosure relates to a wireless communication system. More specifically, the present disclosure relates to: a method for transmitting a physical random access channel (PRACH) in at least one carrier from among a first carrier group on the basis of a channel sensing result, receiving a random access response (RAR) in at least one carrier from among a second carrier group in response to the transmission of the PRACH, and transmitting a physical uplink
(Continued)

shared channel (PUSCH) on the basis of the RAR; and an apparatus therefor.

12 Claims, 19 Drawing Sheets

(51) Int. Cl.
  *H04W 72/0453* (2023.01)
  *H04W 74/00* (2009.01)
  *H04W 72/23* (2023.01)
  *H04W 72/53* (2023.01)

(52) U.S. Cl.
  CPC ........... *H04W 72/23* (2023.01); *H04W 72/53* (2023.01); *H04W 74/006* (2013.01); *H04W 74/0808* (2013.01)

(56) References Cited

U.S. PATENT DOCUMENTS

| | | | |
|---|---|---|---|
| 2017/0331670 | A1 | 11/2017 | Parkvall |
| 2018/0160452 | A1* | 6/2018 | Patil ...................... H04W 16/14 |
| 2019/0253923 | A1 | 8/2019 | Kang |
| 2020/0221503 | A1 | 7/2020 | Kusashima |
| 2020/0280957 | A1 | 9/2020 | Gao |
| 2020/0288453 | A1* | 9/2020 | Zhang ................... H04W 72/12 |
| 2020/0351946 | A1 | 11/2020 | Pang |
| 2020/0351951 | A1 | 11/2020 | Shi |
| 2020/0389282 | A1 | 12/2020 | Turtinen |
| 2020/0404700 | A1 | 12/2020 | Li |
| 2021/0007139 | A1* | 1/2021 | Fu .......................... H04L 5/0094 |
| 2021/0014903 | A1 | 1/2021 | Zhang |
| 2021/0105630 | A1* | 4/2021 | Ishikura ................ H04W 16/32 |
| 2021/0176736 | A1* | 6/2021 | Harada .................. H04W 16/14 |
| 2021/0368545 | A1 | 11/2021 | Xu |

FOREIGN PATENT DOCUMENTS

| | | |
|---|---|---|
| WO | 2011005011 A | 1/2011 |
| WO | 2013168960 A1 | 11/2013 |
| WO | 2015012666 A1 | 1/2015 |
| WO | 2015023128 A1 | 2/2015 |
| WO | 2017023074 A1 | 2/2017 |
| WO | 2017222327 A1 | 12/2017 |

OTHER PUBLICATIONS

NTT DoCoMo, Inc., "Discussion on PRACH for eLAA UL", 3GPP TSG RAN WG1 Meeting #85, May 23-27, 2016, R1-165189.
Samsung, "On the procedures for SUL", 3GPP TSG-RAN WG2 Meeting #100, Nov. 27-Dec. 1, 2017, R2-1712836.
LG Electronics, "Remaining Issues on bandwidth parts", 3GPP TSG RAN WG1 Meeting 91, Nov. 27-Dec. 1, 2017, R1-1719935.
LG Electronics, "Potential solutions for NR unlicensed operation", 3GPP TSG RAN WG1 Meeting #92, Feb. 26-Mar. 2, 2018, R1-1802239.

* cited by examiner

FIG. 12
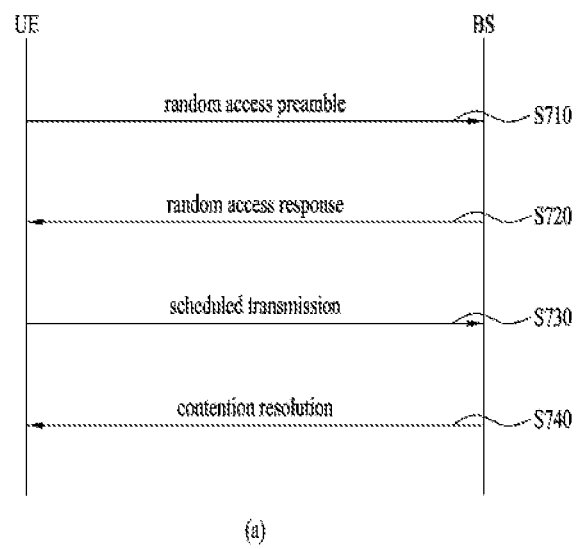
(a)
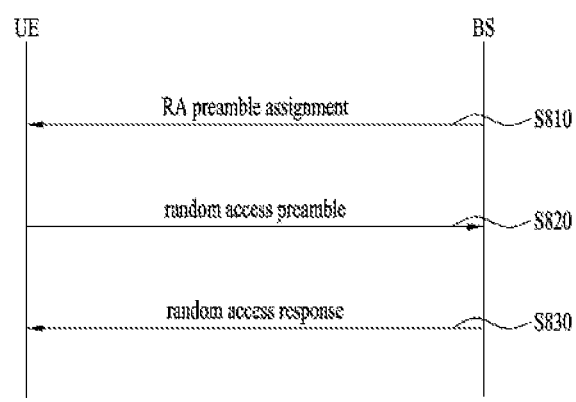
(b)

FIG. 13
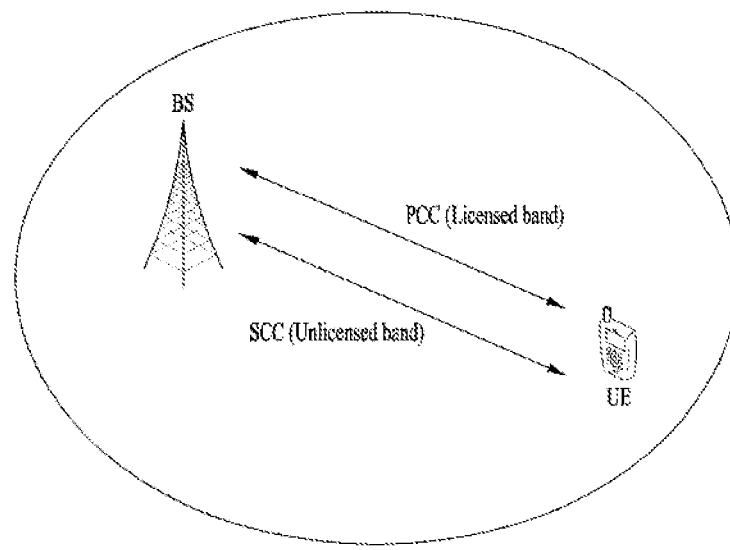
(a) Carrier aggregation between L-band and U-band
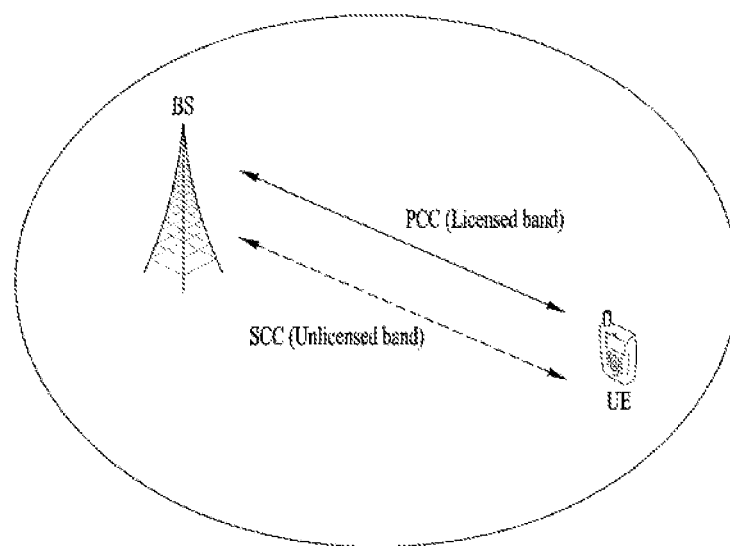
(b) Standalone U-band(s)

FIG. 18
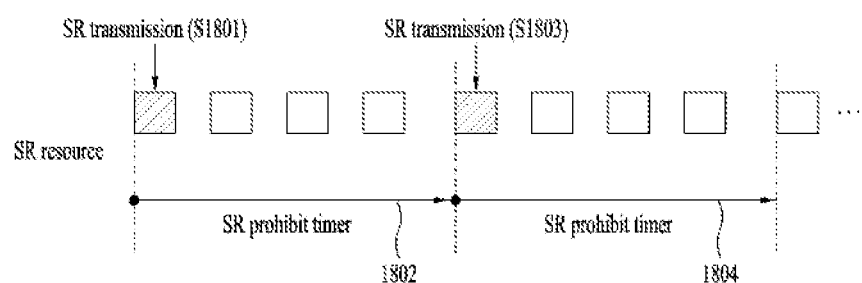
(a)
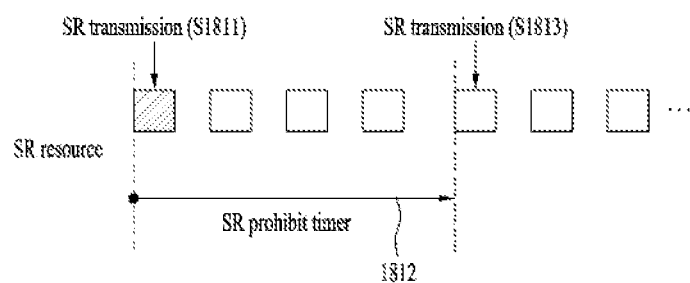
(b)

METHOD FOR TRANSMITTING AND RECEIVING SIGNAL IN WIRELESS COMMUNICATION SYSTEM SUPPORTING UNLICENSED BAND, AND APPARATUS SUPPORTING SAME

This application is a Continuation Application of U.S. patent application Ser. No. 16/976,214 (now U.S. Pat. No. 11,503,650), filed Aug. 27, 2020, which is the National Stage filing under 35 U.S.C. 371 of International Application No. PCT/KR2019/004099 filed Apr. 5, 2019, which claims the benefit of Korean Application Nos. 10-2018-0039483 filed Apr. 5, 2018; 10-2018-0115389 filed Sep. 27, 2018 and 10-2019-0004177 Jan. 11, 2019, the contents of which are all hereby incorporated by reference herein in their entirety.

TECHNICAL FIELD

The present disclosure relates to a method and apparatus in a wireless communication system and, more particularly, to a method of transmitting and receiving a signal in a wireless communication system supporting an unlicensed band and apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

The object of the present disclosure is to provide a method of transmitting and receiving a signal in a wireless communication system supporting an unlicensed band and apparatus for supporting the same It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of transmitting and receiving a signal in a wireless communication system supporting an unlicensed band and apparatus for supporting the same.

In one aspect of the present disclosure, a communication method performed by a device in a wireless communication system is provided. The communication method may include: transmitting a physical random access channel (PRACH) on at least one carrier in a first carrier group based on the results of channel sensing; receiving a random access response (RAR) on at least one carrier in a second carrier group in response to the PRACH transmission; and transmitting a physical uplink shared channel (PUSCH) based on the RAR.

In another aspect of the present disclosure, a device used in a wireless communication system is provided. The device may include: a memory; and a processor, wherein the processor may be configured to: transmit a physical random access channel (PRACH) on at least one carrier in a first carrier group based on results of channel sensing; receive a random access response (RAR) on at least one carrier in a second carrier group in response to the PRACH transmission; and transmit a physical uplink shared channel (PUSCH) based on the RAR.

The above aspects of the present disclosure are merely a part of preferred embodiments of the present disclosure. Various embodiments reflecting the technical features of the present disclosure could be derived and understood based on the following detailed description of the present disclosure by those skilled in the art.

Advantageous Effects

As is apparent from the above description, the embodiments of the present disclosure have the following effects.

According to the present disclosure, an efficient random access procedure for reducing latency caused by channel access in an unlicensed band and UE operations related thereto.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 12 is a diagram illustrating general random access procedures.

FIG. 13 illustrates an exemplary wireless communication system supporting an unlicensed band.

FIG. 18 is a diagram illustrating examples of scheduling request transmission.

BEST MODE

Figure 1:
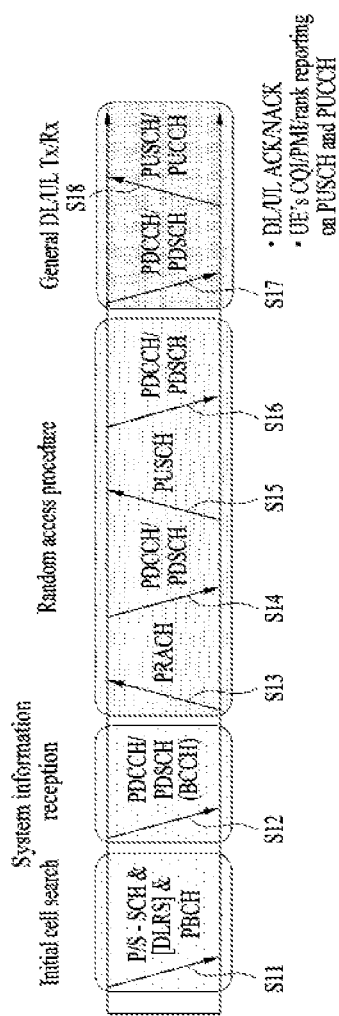
FIG. 1 is a diagram illustrating physical channels and a signal transmission method using the physical channels.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3rd Generation Partnership Project (3GPP) Long Term Evolution/Long Term Evolution-Advanced (LTE/LTE-A) systems and 3GPP new radio access technology (new RAT or NR) system are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A)/LTE-A pro are an evolution of 3GPP LTE. 3GPP NR (New Radio or New Radio Access Technology) is an evolution of 3GPP LTE/LTE-A/LTE-A pro.

Although the present disclosure is described based on 3GPP communication systems (e.g., LTE-A, NR, etc.) for clarity of description, the spirit of the present disclosure is not limited thereto. The LTE refers to technologies beyond 3GPP technical specification (TS) 36.xxx Release 8. In particular, LTE technologies beyond 3GPP TS 36.xxx Release 10 are referred to as the LTE-A, and LTE technologies beyond 3GPP TS 36.xxx Release 13 are referred to as the LTE-A pro. The 3GPP NR refers to technologies beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the present disclosure may be supported by the following documents: 3GPP TS 36.211, 3GPP TS 36.212, 3GPP TS 36.213, 3GPP TS 36.300, 3GPP TS 36.321, 3GPP TS 36.331, 3GPP TS 37.213, 3GPP TS 38.211, 3GPP TS 38.212, 3GPP TS 38.213, 3GPP TS 38.214, 3GPP 38.300, 3GPP TS 38.321, and 3GPP TS 38.331. That is, the steps or parts, which are not explained to clearly reveal the technical idea of the present disclosure, in the embodiments of the present disclosure may be supported by the above documents.

While the embodiments of the present disclosure are described in the context of 3GPP LTE/LTE-A systems and 3GPP NR system in order to clarify the technical features of the present disclosure, the present disclosure is also applicable to an IEEE 802.16e/m system, etc.

Physical Channel and Frame Structure

Physical Channel and General Signal Transmission

FIG. 1 illustrates physical channels and a general signal transmission method using the physical channels, which may be used in 3GPP system.

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS. Then the UE may acquire information broadcast in the cell by receiving a physical broadcast channel (PBCH) from the base station. During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc. In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

Radio Frame Structure

Figure 2:
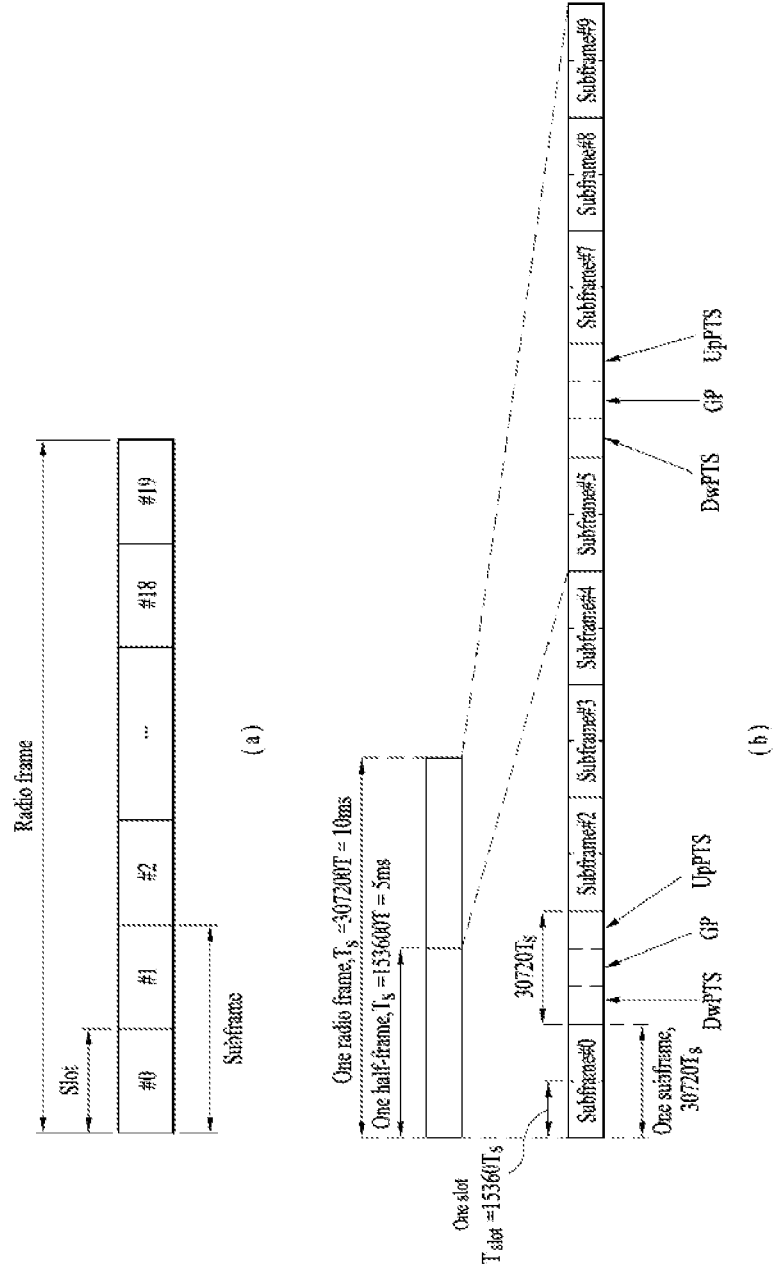
FIG. 2 is a diagram illustrating radio frame structures.
Figure 3:
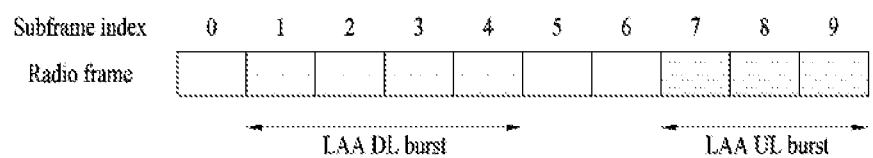
FIG. 3 is a diagram illustrating frame structure type 3.

FIGS. 2 and 3 are diagrams illustrating radio frame structures in an LTE system to which the embodiments of the present disclosure are applicable.

The LTE system supports frame structure type 1 for frequency division duplex (FDD), frame structure type 2 for time division duplex (TDD), and frame structure type 3 for an unlicensed cell (UCell). In the LTE system, up to 31 secondary cells (SCells) may be aggregated in addition to a primary cell (PCell). Unless otherwise specified, the following operation may be applied independently on a cell basis. In multi-cell aggregation, different frame structures may be used for different cells. Further, time resources (e.g., a subframe, a slot, and a subslot) within a frame structure may be generically referred to as a time unit (TU).

FIG. 2(a) illustrates frame structure type 1. A DL radio frame is defined by 10 1-ms subframes. A subframe includes 14 or 12 symbols according to a cyclic prefix (CP). In a normal CP case, a subframe includes 14 symbols, and in an extended CP case, a subframe includes 12 symbols. Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

One subframe may be defined by one or more slots according to a subcarrier spacing (SCS) as follows.

When SCS=7.5 kHz or 15 kHz, subframe #i is defined by two 0.5-ms slots, slot #2i and slot #2i+1 (i=0~9).

When SCS=1.25 kHz, subframe #i is defined by one 1-ms slot, slot #2i.

When SCS=15 kHz, subframe #i may be defined by six subslots as illustrated in Table 1.

Table 1 lists exemplary subslot configurations for one subframe (normal CP).

TABLE 1

| Subslot number | 0 | 1 | 2 | 3 | 4 | 5 |
|---|---|---|---|---|---|---|
| Slot number | | 2i | | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 2 shows subframe configurations in a radio frame according to UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

D denotes a downlink subframe, U denotes an uplink subframe and S denotes a special subframe. The special subframe includes DwPTS (Downlink Pilot Time Slot), GP (Guard Period), and UpPTS (Uplink Pilot Time Slot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

Table 3 lists exemplary special subframe configurations.

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot$ | $(1 + X) \cdot$ | $7680 \cdot T_s$ | $(1 + X) \cdot$ | $(1 + X) \cdot$ |
| 1 | $19760 \cdot T_s$ | $2192 \cdot T_s$ | $2560 \cdot T_s$ | $20480 \cdot T_s$ | $2192 \cdot T_s$ | $2560 \cdot T_s$ |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot$ | $(2 + X) \cdot$ |
| 5 | $6592 \cdot T_s$ | $(2 + X) \cdot$ | $(2 + X) \cdot$ | $20480 \cdot T_s$ | $2192 \cdot T_s$ | $2560 \cdot T_s$ |
| 6 | $19760 \cdot T_s$ | $2192 \cdot T_s$ | $2560 \cdot T_s$ | $23040 \cdot T_s$ | | |
| 7 | $21952 \cdot T_s$ | | | $12800 \cdot T_s$ | | |
| 8 | $24144 \cdot T_s$ | — | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

In Table 3, X is configured by higher-layer signaling (e.g., radio resource control (RRC) signaling or the like) or given as 0.

FIG. 3 is a diagram illustrating frame structure type 3.

Frame structure type 3 may be applied to UCell operation. Frame type 3 may be applied to licensed assisted access (LAA) SCell operation with a normal CP, but it is not limited thereto. A frame has a duration of 10 ms, and thus it is defined as 10 1-ms subframes. Subframe #i is defined as two consecutive slots: slot #2i and slot #2i+1. Each subframe may be used for DL or UL transmission or left empty. A DL burst occupies one or more consecutive subframes, starting at any point in a subframe and ending at the boundary thereof or in the DwPTS of Table 3. A UL burst also occupies one or more consecutive subframes.

Figure 4:
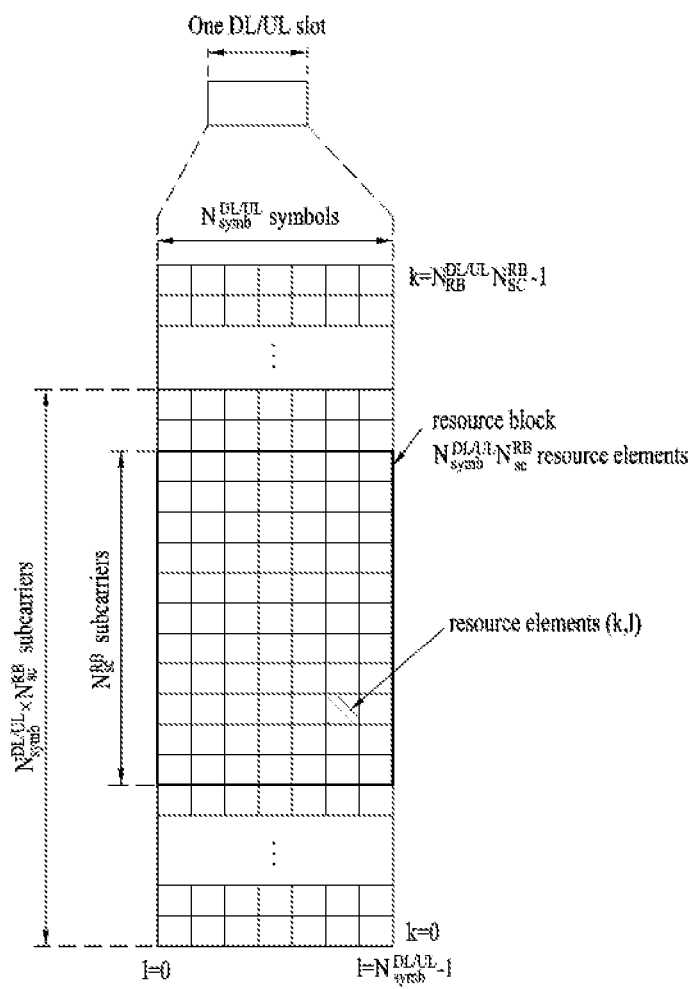
FIG. 4 is a diagram illustrating a slot structure in the LTE system.

FIG. 4 is a diagram illustrating a slot structure in an LTE system to which embodiments of the present disclosure are applied.

Referring to FIG. 4, a slot includes a plurality of OFDM symbols in the time domain by a plurality of resource blocks (RBs) in the frequency domain. A symbol may refer to a symbol duration. A slot structure may be described by a resource grid including $N^{DL/UL}_{RB} N^{RB}_{sc}$ subcarriers and $N^{DL/UL}_{symb}$ symbols. $N^{DL}_{RB}$ denotes the number of RBs in a DL slot, and $N^{UL}_{RB}$ denotes the number of RBs in a UL slot. $N^{DL}_{RB}$ and $N^{UL}_{RB}$ are dependent on a DL bandwidth and a UL bandwidth, respectively. $N^{DL}_{symb}$ denotes the number of symbols in the DL slot, and $N^{UL}_{symb}$ denotes the number of symbols in the UL slot. $N^{RB}_{sc}$ denotes the number of subcarriers in one RB. The number of symbols in a slot may vary depending on SCSs and CP lengths (see Table 1). For example, while one slot includes 7 symbols in a normal CP case, one slot includes 6 symbols in an extended CP case.

An RB is defined as $N^{DL/UL}_{symb}$ (e.g., 7) consecutive symbols in the time domain by $N^{RB}_{sc}$ (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource with one symbol by one subcarrier is referred to as a resource element (RE) or tone. Each RE in the resource grid may be uniquely identified by an index pair (k, 1) in a slot, where k is a frequency-domain index ranging from 0 to $N^{DL/UL}_{RB} \times N^{RB}_{sc} - 1$ and 1 is a time-domain index ranging from 0 to $N^{DL/UL}_{sym} - 1$.

Figure 5:
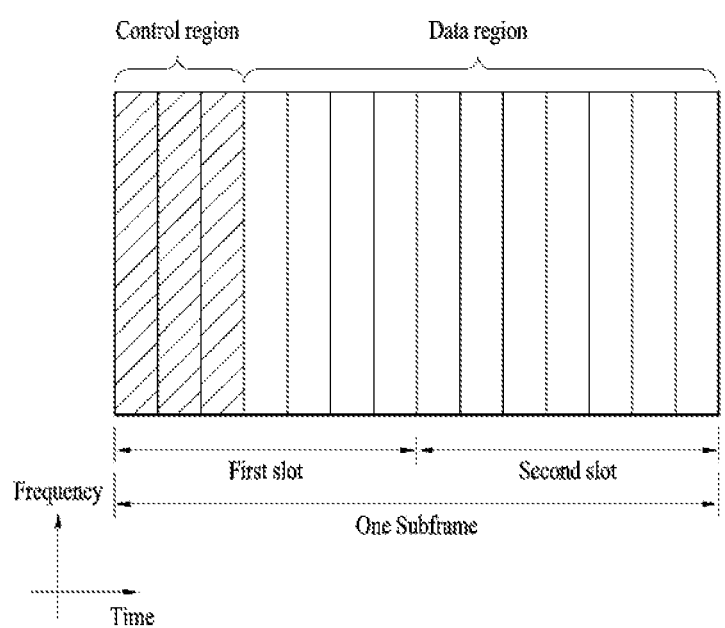
FIG. 5 is a diagram illustrating a downlink subframe structure in the LTE system.

FIG. 5 illustrates a DL subframe structure in an LTE system to which the embodiments of the present disclosure are applicable.

Referring to FIG. 5, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc.

The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Figure 6:
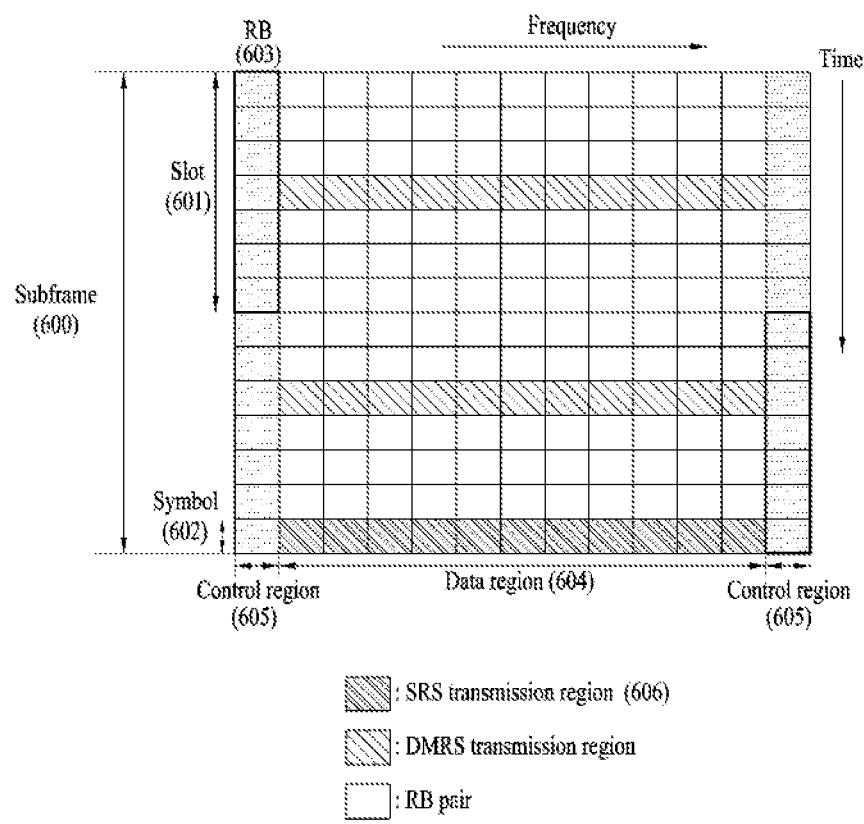
FIG. 6 is a diagram illustrating an uplink subframe structure in the LTE system.

FIG. 6 is a diagram illustrating a UL subframe structure in an LTE system to which the embodiments of the present disclosure are applicable.

Referring to FIG. 6, one subframe 500 includes two 0.5-ms slots 501. Each slot includes a plurality of symbols 502, each corresponding to one SC-FDMA symbol. An RB 503 is a resource allocation unit corresponding to 12 subcarriers in the frequency domain by one slot in the time domain.

A UL subframe is divided largely into a data region 504 and a control region 505. The data region is communication resources used for each UE to transmit data such as voice, packets, and so on, including a physical uplink shared channel (PUSCH). The control region is communication resources used for each UE to transmit an ACK/NACK for a DL channel quality report or a DL signal, a UL scheduling request, and so on, including a physical uplink control channel (PUCCH).

A sounding reference signal (SRS) is transmitted in the last SC-FDMA symbol of a subframe in the time domain.

Figure 7:
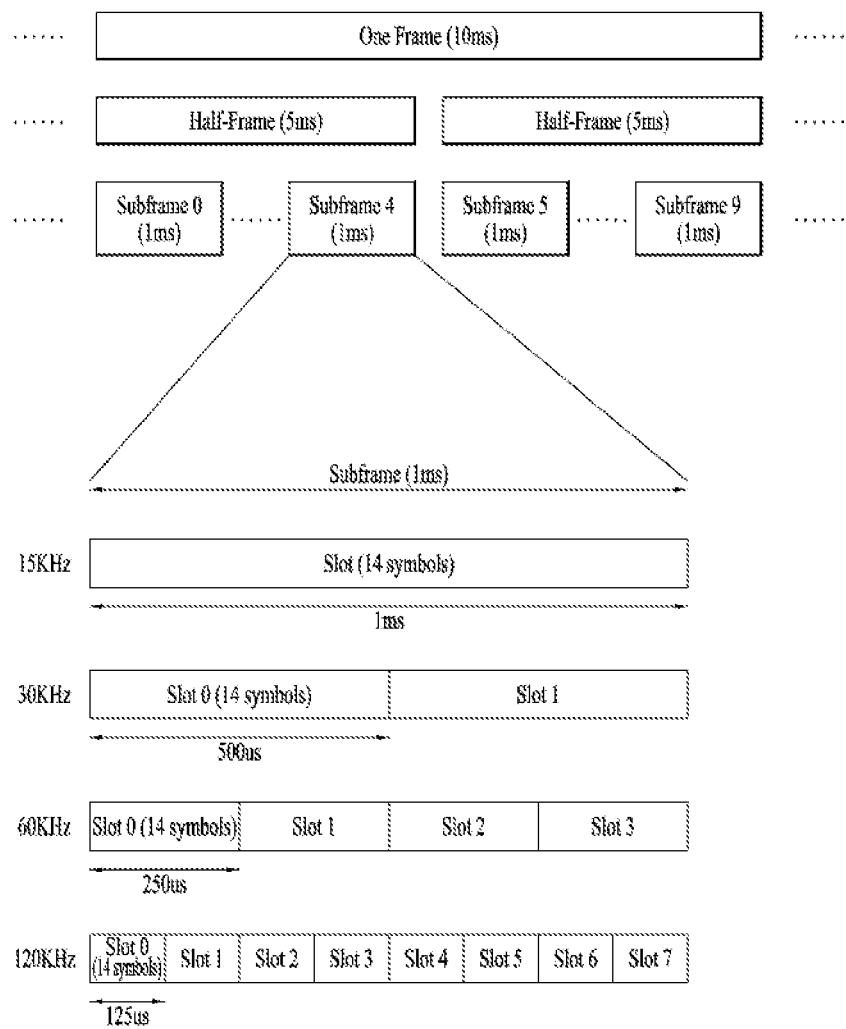
FIG. 7 is a diagram illustrating a radio frame structure in a new radio access technology (NR) system.

FIG. 7 is a diagram illustrating a radio frame structure in a NR system to which the embodiments of the present disclosure are applicable.

In the NR system, UL and DL transmissions are based on a frame as illustrated in FIG. 7. One radio frame is 10 ms in duration, defined as two 5-ms half-frames. One half-frame is defined as five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM symbol) and an SC-FDMA symbol (or a DFT-s-OFDM symbol).

Table 4 lists the number of symbols per slot, the number of slots per frame, and the number of slots per subframe in the normal CP case, and Table 5 lists the number of symbols per slot, the number of slots per frame, and the number of slots per subframe in the extended CP case.

TABLE 4

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ denotes the number of symbols in a slot, $N^{frame,\mu}_{slot}$ denotes the number of slots in a frame, and $N^{subframe,\mu}_{slot}$ denotes the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 8:
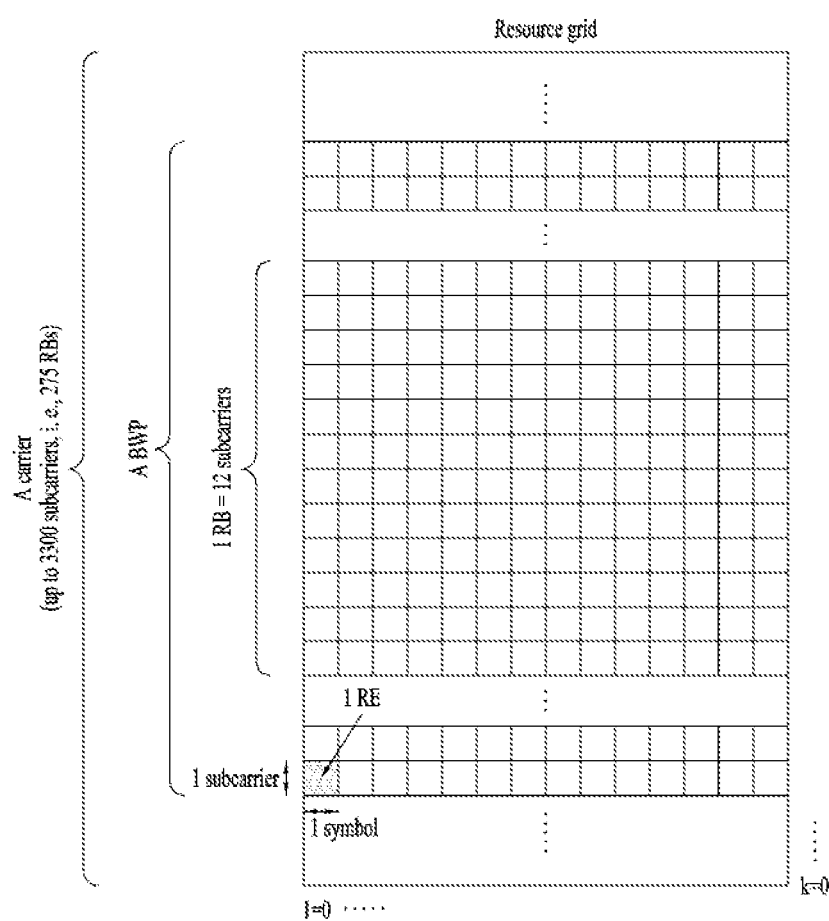
FIG. 8 is a diagram illustrating a slot structure in the NR system.

FIG. 8 is a diagram illustrating a slot structure in a NR system to which the embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined as a plurality of (e.g., 12) consecutive subcarriers in the frequency domain.

A bandwidth part (BWP) is defined as a plurality of consecutive (P)RBs in the frequency domain and may correspond to one numerology (e.g., SCS, CP length, and so on).

A carrier may include up to N (e.g., 5) BWPs. Data communication may be conducted in an active BWP, and only one BWP may be activated for one UE. In a resource grid, each element is referred to as an RE, to which one complex symbol may be mapped.

Figure 9:
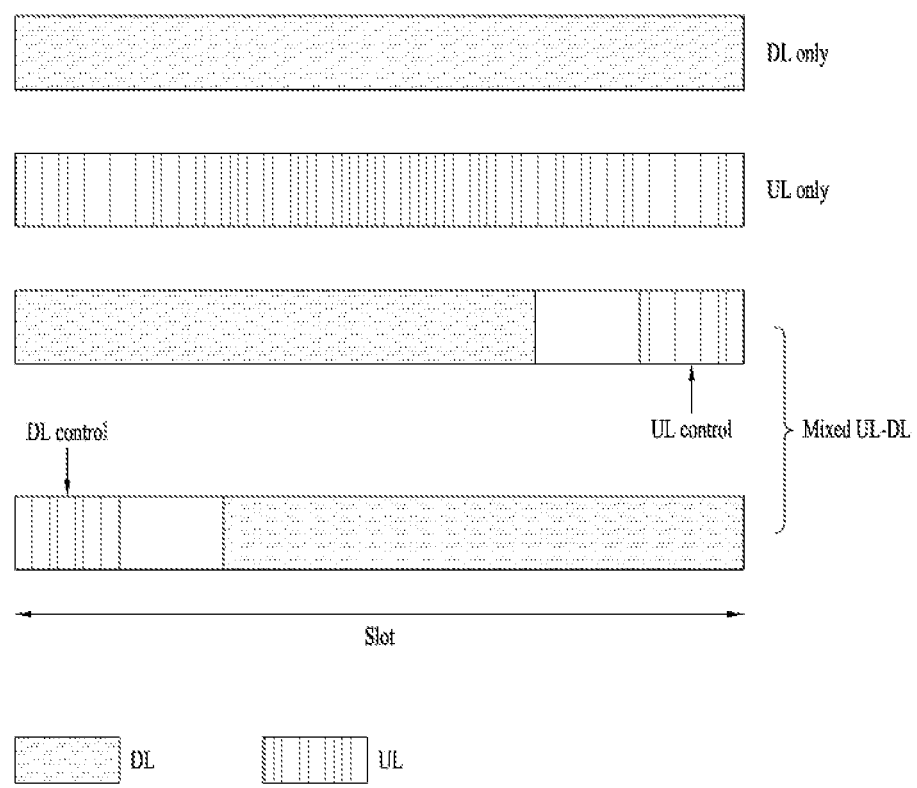
FIG. 9 is a diagram illustrating self-contained slot structures in the NR system.

FIG. 9 is a diagram illustrating a self-contained slot structures in a NR system to which the embodiments of the present disclosure are applicable.

In the NR system, a frame has a self-contained structure capable of including a DL control channel, DL or UL data, a UL control channel, etc. in one slot. For example, the first N symbols (hereinafter referred to as a DL control region) in the slot may be used to transmit a DL control channel, and the last M symbols (hereinafter referred to as a UL control region) in the slot may be used to transmit a UL control channel. N and M are integers greater than or equal to 0. A resource region (hereinafter referred to as a data region) between the DL control region and the UL control region may be used for DL data transmission or UL data transmission. There may be a time gap for DL-to-UL or UL-to-DL switching between control and data regions. For example, the following configurations may be considered. Each section is listed in chronological order.

1. DL only configuration
2. UL only configuration
3. Mixed UL-DL configuration
  DL region+GP+UL control region
  DL control region+GP+UL region
  *DL region: (i) DL data region and/or (ii) DL control region+DL data region
  *UL region: (i) UL data region and/or (ii) UL data region+UL control region A PDCCH may be transmitted in the DL control region, and a PDSCH may be transmitted in the DL data region. A PUCCH may be transmitted in the UL control region, and a PUSCH may be transmitted in the UL data region. The PDCCH may carry DCI, for example, DL data scheduling information, UL data scheduling information, etc. The PUCCH may carry UCI, for example, positive/negative acknowledgement (ACK/NACK) information for DL data, channel state information (CSI), a scheduling request (SR), etc. The GP provides a time gap for a BS and a UE to switch from transmission mode to reception mode and vice versa. Several symbols at the time of DL-to-UL switching in a subframe may be set to the GP.

Figure 10:
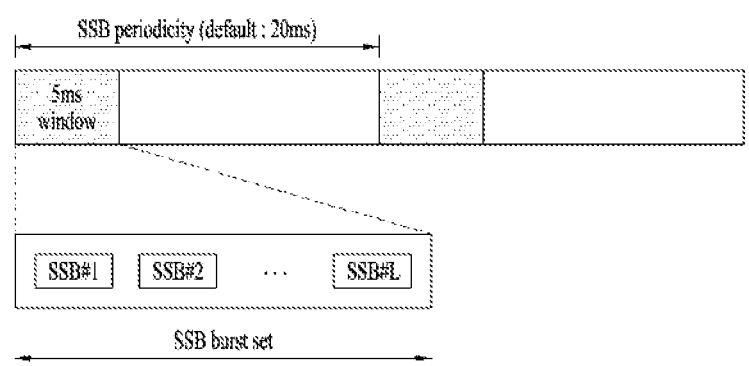
FIG. 10 is a diagram illustrating synchronization signal block (SSB) transmission.

FIG. 10 illustrates synchronization signal block (SSB) transmission.

An SSB includes an SS/PBCH block, and it is transmitted with an SSB periodicity. A default SSB periodicity used for initial cell selection is defined as 20 ms. After cell access, the SSB periodicity may be set to one of {5 ms, 10 ms, 20 ms, 40 ms, 80 ms, and 160 ms}. An SSB burst set may be configured at the beginning of each SSB periodicity. The SSB burst may have a time window of 5 ms, and the SSB may be transmitted in the SSB burst set at most L times. The candidate location of the SSB may be predefined within the SS burst set. The maximum number of SSB transmissions L may be given as follows depending on carrier frequency bands.

For frequency range up to 3 GHz, L=4
For frequency range from 3 GHz to 6 GHz, L=8
For frequency range from 6 GHz to 52.6 GHz, L=64

Based on the SSB, the UE may perform DL synchronization acquisition (e.g., OFDM symbol/slot/half-frame boundary detection), cell ID (e.g., physical cell identifier (PCID)) acquisition, beam alignment for initial access, mater information block (MIB) acquisition, DL measurement, etc.

Figure 11:
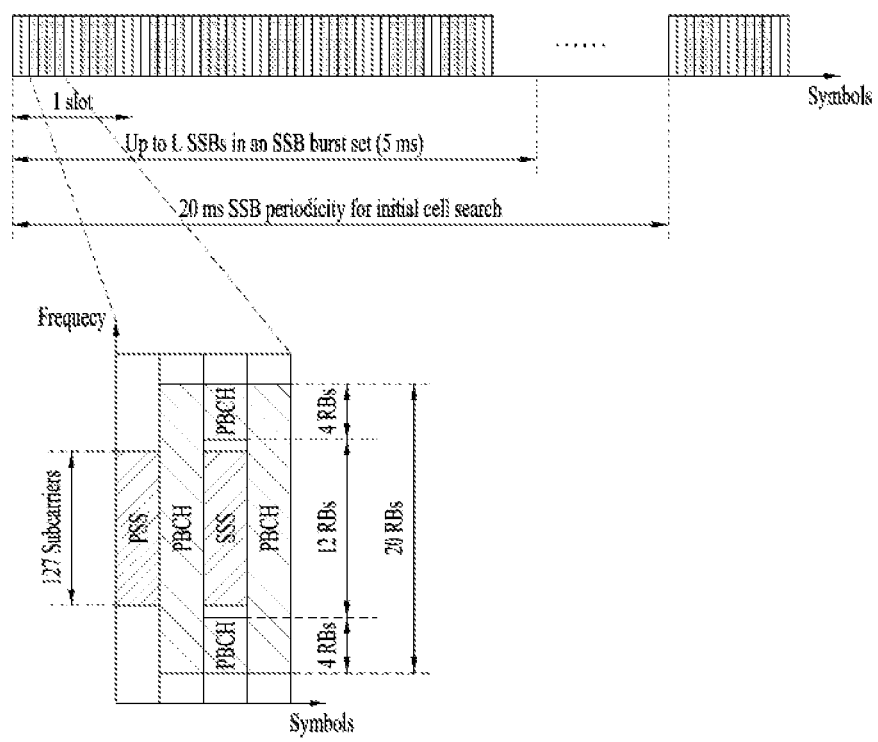
FIG. 11 is a diagram illustrating the structure of an SSB.

FIG. 11 illustrates an SSB structure. A slot may include at most two SSBs. An SSB includes four consecutive OFDM symbols, and a PSS, PBCH, SSS/PBCH and PBCH are transmitted in the OFDM symbols, respectively. The PSS may be used to detect a cell ID from a cell ID group, and the SSS may be used to detect the cell ID group. The PBCH is used to detect an SSB (time) index and a half-frame and includes an MIB. The PBCH includes a data RE and a demodulation reference signal (DMRS) RE in each OFDM symbol. Three DMRS REs are present in each RB, and three data REs are present between DMRS REs.

Table 6 shows the configuration of PBCH payload.

TABLE 6

| Field | Size (bits) |
| --- | --- |
| Cyclic Redundancy Check (CRC) | 24 |
| System Frame Number (SFN) | 10 |
| Physical RB (PRB) grid offset | 4 |
| SCS indication | 1 |
| Half frame Indication | 1 |
| Most Significant Bit (MSB) of SSB index (for above 6GHz) | 3 |

The time locations (SSB indices) of the SSB are indexed from 0 to L-1 in an SSB burst set (i.e., half-frame). For L=8 or 64, the three least significant bits (LSBs) of the SSB index may be indicated by 8 different PBCH-DMRS sequences. For L=2, the two LSBs of the SSB index may be indicated by four different PBCH-DMRS sequences. For L=4, among three bits indicated by 8 PBCH-DMRS sequences, one remaining bit after indicating the SSB index may be used to indicate the half-frame.

A UE may obtain DL synchronization by detecting the SSB. Specifically, the UE may identify the structure of the SSB burst set by detecting the SSB index and then detect an OFDM symbol/slot/half-frame boundary. The number of the frame including the detected SSB may be identified based on SFN information in the MIB, and the number of the half-frame including the detected SSB may be identified based on half-frame indication information in the MIB.

FIG. 12 illustrates general random access procedures.

A random access procedure is used for various purposes. For example, the random access procedure may be used for network initial access, handover, and UE-triggered UL data transmission. There are a contention-based random access procedure and a non-contention-based or dedicated random access procedure. The term random access procedure is interchangeably used with RACH procedure.

FIG. 12(a) illustrates an exemplary contention-based random access procedure.

Referring to FIG. 12(a), a UE receives information about random access in system information from a BS. When random access is required, the UE transmits a random access preamble (Msg 1) to the BS (S710). Upon receipt of the random access preamble from the UE, the BS transmits an RAR message (Msg 2) to the UE (S720). Specifically, scheduling information for the RAR message may be cyclic redundancy check (CRC)-masked by a random access-radio network temporary identity (RA-RNTI) and transmitted on an L1/L2 control channel (PDCCH). The PDCCH masked by the RA-RNTI may be transmitted only in a common search space. Upon receipt of the scheduling signal masked by the RA-RNTI, the UE may receive an RAR message on a PDSCH indicated by the scheduling information. The UE then checks whether the RAR message includes RAR information directed to the UE. The UE may determine the presence or absence of the RAR information directed to the UE by determining whether the random access preamble ID (RAID) of the transmitted preamble exists. The RAR information includes timing offset information (e.g., a timing advance command (TAC)) for UL synchronization, UL scheduling information (e.g., a UL grant), and UE temporary identification information (e.g., a temporary cell-RNTI (TC-RNTI)). Upon receipt of the RAR information, the UE transmits UL-SCH data (Msg 3) on a PUSCH according to UL scheduling information (S730). After receiving the UL-SCH data, the BS transmits a contention resolution message (Msg 4) to the UE (S740).

FIG. 12(b) illustrates a non-contention-based random access procedure. The non-contention-based random access procedure may be performed during handover or upon request by a command from a BS. The non-contention-based random access procedure is basically identical to the contention-based random access procedure.

Referring to FIG. 12(b), the UE is allocated a dedicated random access preamble by the BS (S810). Dedicated random access preamble indication information (e.g., a preamble index) may be received in an RRC message (e.g., handover command) or a PDCCH order. After the random access procedure is initiated, the UE transmits the dedicated random access preamble to the BS (S820). Subsequently, the UE receives an RAR from the BS (S830), and the random access procedure ends. A random access procedure in an SCell may be initiated only by a PDCCH order.

In NR, DCI format 1_0 is used to initiate the non-contention-based random access procedure by a PDCCH order. DCI format 1_0 is used to schedule a PDSCH in one DL cell. When the CRC of DCI format 1_0 is scrambled with a C-RNTI and the bits of a "frequency domain resource assignment" field are all 1s, DCI format 1_0 is used as the PDCCH order indicating the random access procedure. In this case, fields of DCI format 1_0 are configured as follows.

RA preamble index: 6 bits

UL/supplementary UL (SUL) indicator: 1 bit. When all bits of the RA preamble index are non-zeroes and the UE is configured with SUL in the cell, the UL/SUL indicator indicates a UL carrier in which a PRACH is transmitted in the cell. Otherwise, the UL/SUL indicator is reserved.

SSB index: 6 bits. When all bits of the RA preamble index are non-zeroes, the SSB index indicates an SSB used to determine an RACH occasion for PRACH transmission. Otherwise, the SSB index is reserved.

PRACH mask index: 4 bits. When all bits of the RA preamble index are non-zeroes, the PRACH mask index indicates an RACH occasion associated with the SSB indicated by the SSB index. Otherwise, the PRACH mask index is reserved.

Reserved: 10 bits.

When DCI format 1_0 is not a PDCCH order, DCI format 1_0 is configured with fields used to schedule a PDSCH (e.g., a time domain resource assignment, a modulation and coding scheme (MCS), an HARQ process number, a PDSCH-to-HARQ_feedback timing indicator, and so on).

Wireless Communication System Supporting Unlicensed Band

FIG. 13 illustrates an exemplary wireless communication system supporting an unlicensed band, which is applicable to the present disclosure.

In the following description, a cell operating in a licensed band (hereinafter, referred to as L-band) is defined as an L-cell, and a carrier of the L-cell is defined as a (DL/UL) LCC. In addition, a cell operating in an unlicensed band (hereinafter, referred to as a U-band) is defined as a U-cell, and a carrier of the U-cell is defined as a (DL/UL) UCC. The carrier/carrier-frequency of the cell may refer to the operating frequency (e.g., center frequency) of the cell. A cell/carrier (e.g., CC) is collectively referred to as a cell.

As illustrated in FIG. 13(a), when the UE and the BS transmit and receive signals in carrier-aggregated LCC and UCC, the LCC may be configured as a primary CC (PCC) and the UCC may be configured as a secondary CC (SCC). As illustrated in FIG. 13(b), the UE and the BS may transmit and receive signals in one UCC or a plurality of carrier-aggregated LCC and UCC. That is, the UE and the BS may transmit and receive signals only in the UCC(s) without the LCC.

The above-described operation of transmitting and receiving a signal in a U-band according to the present disclosure may be performed based on all the deployment scenarios described above (unless otherwise stated).

Radio Frame Structure for Unlicensed Band

For operation in U-bands, LTE frame structure type 3 (see FIG. 3) or the NR frame structure (see FIG. 8) may be used. The configuration of OFDM symbols reserved for UL/DL signal transmission in a frame structure for U-bands may be determined by a BS. In this case, the OFDM symbol may be replaced with an SC-FDM(A) symbol.

To transmit a DL signal in a U-band, the BS may inform a UE of the configuration of OFDM symbols used in subframe #n through signaling. Herein, a subframe may be replaced with a slot or a time unit (TU).

Specifically, in the LTE system supporting U-bands, the UE may assume (or recognize) the configuration of occupied OFDM symbols in subframe #n based on a specific filed in DCI (e.g., 'Subframe configuration for LAA' field, etc.), which is received in subframe #n−1 or subframe #n from the BS.

Table 7 shows how the Subframe configuration for LAA field indicates the configuration of OFDM symbols used to transmit DL physical channels and/or physical signals in the current or next subframe.

Table 7 shows how the Subframe configuration for LAA field indicates the configuration of OFDM symbols used to transmit DL physical channels and/or physical signals in the current or next subframe.

TABLE 7

| Value of 'Subframe configuration for LAA' field in current subframe | Configuration of occupied OFDM symbols (current subframe, next subframe) |
|---|---|
| 0000 | (—, 14) |
| 0001 | (—, 12) |

TABLE 7-continued

| Value of 'Subframe configuration for LAA' field in current subframe | Configuration of occupied OFDM symbols (current subframe, next subframe) |
|---|---|
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

To transmit a UL signal in a U-band, the BS may provide information on a UL transmission interval to the UE through signaling.

Specifically, in the LTE system supporting U-bands, the UE may obtain 'UL duration' and 'UL offset' information for subframe #n from the 'UL duration and offset' field in detected DCI.

Table 8 shows how the UL duration and offset field indicates the configurations of a UL offset and a UL duration.

TABLE 8

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the UL duration and offset field configures (or indicates) a UL offset 1 and a UL duration d for subframe #n, the UE may not need to receive DL physical channels and/or physical signals in subframe #n+1+i (where i=0, 1, . . . , d-1).

DL Signal Transmission in Unlicensed Band

For DL signal transmission in an unlicensed band, a BS may perform a DL channel access procedure (CAP) for the unlicensed hand as follows.

(1) First DL CAP Method

Figure 14:
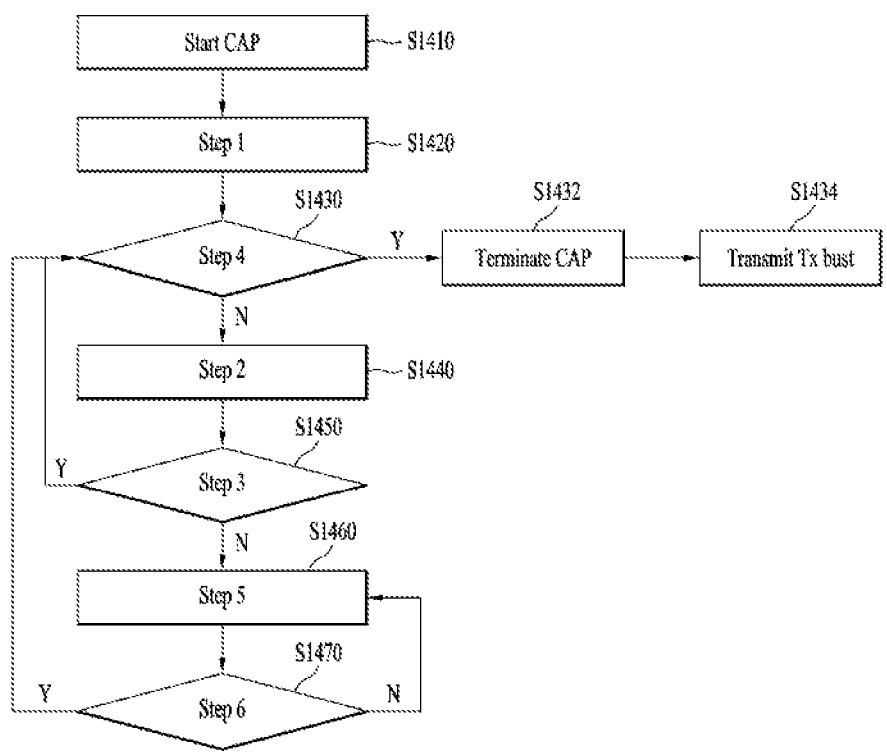
FIG. 14 is a flowchart illustrating a channel access procedure (CAP) for a base station (BS) to transmit a downlink signal in an unlicensed band.

FIG. 14 is a flowchart illustrating CAP operations for a BS to transmit a DL signal in an unlicensed band.

The BS may initiate the CAP for DL signal transmission (including a PDSCH/PDCCH/EPDCCH) in the unlicensed band (S1410). The BS may randomly select a backoff counter N within a contention window (CW) according to step 1. N is set to an initial value $N_{init}$ (S1420). $N_{init}$ is a random value selected between 0 and $CW_p$. Subsequently, when the backoff counter value N is 0 according to step 4 (S1430; Y), the BS terminates the CAP (S1432). The BS may then perform a Tx burst transmission (S1434). On the contrary, when the backoff counter value N is not 0 (S1430; N), the BS decrements the backoff counter value by 1 according to step 2 (S1440). Subsequently, the BS checks whether the channel is idle (S1450). If the channel is idle (S1450; Y), the BS determines whether the backoff counter value is 0 (S1430). On the contrary, when the channel is not idle, that is, the channel is busy in operation S1450 (S1450; N), the BS determines whether the channel is idle during a longer defer duration $T_d$ (25 usec or longer) than a sensing slot duration (e.g., 9 usec) (S1460). If the channel is idle during the defer duration (S1470; Y), the BS may resume the CAP. On the other hand, when the channel is busy during the defer duration (S1470; N), the BS determines again whether the channel is idle during a new defer duration by performing step 1460 again.

Table 9 shows that the values of $m_p$, a minimum CW, a maximum CW, a maximum channel occupancy time (MCOT), and allowed CW sizes, which are applied to the CAP, vary depending on channel access priority classes.

TABLE 9

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The size of a CW applied to the first DL CAP may be determined in various ways. For example, the size of the CW may be adjusted based on a probability that HARQ-ACK values for PDSCH transmission(s) within a predetermined period of time (e.g., reference TU) are determined as NACK. When the BS performs the DL signal transmission on a carrier including a PDSCH associated with the channel access priority class P, if a probability that HARQ-ACK values for PDSCH transmission(s) in reference subframe k (or reference slot k) are determined as NACK is at least Z=80%, the BS increases a CW value configured for each priority class to a next allowed value. Alternatively, the BS maintains the CW value configured for each priority class as an initial value. The reference subframe (or reference slot) may be defined as a starting subframe (or starting slot) where transmission is performed most recently on the corresponding carrier where at least part of HARQ-ACK feedback is available.

(2) Second DL CAP Method

The BS may perform the DL signal transmission in the unlicensed band based on the following second DL CAP method (the signal transmission includes discovery signal transmission but includes no PDSCH).

When the duration of the signal transmission of the BS is less than or equal to 1 ms, the BS may transmit a downlink signal (including discovery signal transmission with no PDSCH in the unlicensed band immediately after sensing that a corresponding channel is idle at least for a sensing duration of $T_{drs}$=25 us. Here, $T_{drs}$ includes a duration $T_f$ of 16 us immediately followed by one slot duration $T_{sl}$ of 9 us.

(3) Third DL CAP Method

To perform DL signal transmission on multiple carriers in the unlicensed band, the BS may perform the CAP as follows.

1) Type A: The BS may perform the CAP for the multiple carriers based on a counter defined for each carrier N (i.e., counter N considered for the CAP) and perform the DL signal transmission based thereon.

Type A1: The counter for each carrier N is determined independently, and the DL signal transmission on the multiple carriers is performed based on the counter for each carrier N.

Type A2: The counter for each carrier N is determined as the value of N for a carrier with the largest CW size, and the DL signal transmission on the multiple carriers is performed based on the counter for each carrier N.

2) Type B: The BS performs the CAP for a specific carrier among the multiple carriers based on the counter N. Before transmitting a signal on the specific carrier, the BS determines whether the channel is idle on the remaining carriers. Then, the BS performs the DL signal transmission.

Type B1: A single CW size is defined for the multiple carriers. When performing the CAP for the specific carrier based on the counter N, the BS uses the single CW size.

Type B2: A CW is defined for each carrier. When determining the value of $N_{init}$ for the specific carrier, the BS uses the largest CW size among CW sizes.

UL Signal Transmission in Unlicensed Band

A UE performs a contention-based CAP for UL signal transmission in an unlicensed band. Specifically, the UE may perform a Type 1 CAP or a Type 2 CAP for the UL signal transmission in the unlicensed band. In general, the UE may perform a CAP configured by a BS (e.g., Type 1 CAP or Type 2 CAP) for the UL signal transmission.

(1) Type 1 UL CAP Method

Figure 15:
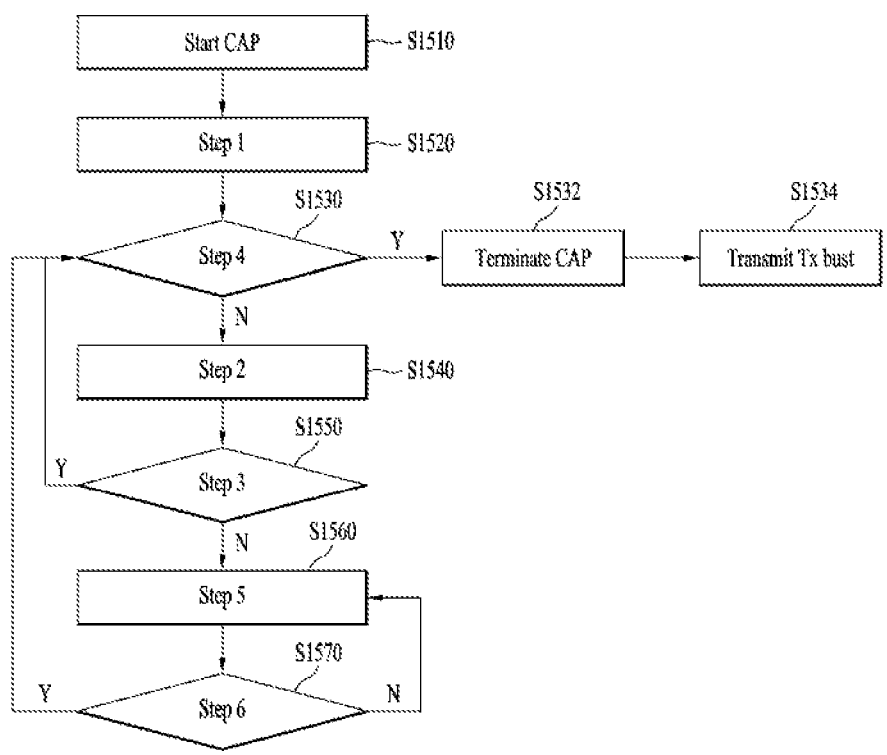
FIG. 15 is a flowchart illustrating a CAP for a user equipment (UE) to transmit an uplink signal in an unlicensed band.

FIG. 15 is a flowchart illustrating Type 1 CAP operations for a UE to transmit a UL signal.

The UE may initiate the CAP for the signal transmission in the unlicensed band (S1310). The UE may select a backoff counter N randomly within a CW according to step 1. N is set to an initial value $N_{init}$ (S1520). $N_{init}$ is a value randomly selected between 0 and $CW_p$. Subsequently, when the backoff counter value N is 0 according to step 4 (S1530; Y), the UE ends the CAP (S1532). The UE may then transmit a Tx burst (S1534). On the other hand, if the backoff counter value is not 0 (S1530; N), the UE decrements the backoff counter value by 1 according to step 2 (S1540). Subsequently, the UE checks whether a channel is idle (S1550). If the channel is idle (S1550; Y), the UE checks whether the backoff counter value is 0 (S1530). On the contrary, if the channel is not idle, that is, the channel is busy (S1550; N), the UE checks whether the channel is idle for a defer duration $T_d$ (of 25 usec or more) longer than a slot duration (e.g., 9 usec) according to step 5 (S1560). If the channel is idle for the defer duration (S1570; Y), the UE may resume the CAP. Here, the defer duration may include a duration of 16 usec and $m_p$ consecutive slot durations (e.g., 9 usec), which immediately follows the duration of 16 usec. On the other hand, if the channel is busy for the defer duration (S1570; N), the UE checks again whether the channel is idle for a new defer duration by performing operation 1560 again.

Table 10 shows that the values of $m_p$, a minimum CW, a maximum CW, an MCOT, and allowed CW sizes, which are applied to the CAP, vary depending on channel access priority classes.

TABLE 10

| Channel Access Priority Class (p) | $m_p$ | $CW_{min,p}$ | $CW_{max,p}$ | $T_{ulmcot,p}$ | allowed $CW_p$ sizes |
| --- | --- | --- | --- | --- | --- |
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 µs. The maximum duration before including any such gap shall be 6 ms.

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH within a predetermined period of time (e.g., reference TU), is toggled. When the UE performs signal transmission based on the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class p∈{1, 2, 3, 4}. Otherwise, the UE may increase $CW_p$ for every priority class p∈{1, 2, 3, 4} to a next higher allowed value.

A reference subframe (or reference slot) $n_{ref}$ may be determined as follows.

When the UE receives a UL grant in a subframe (or slot) $n_g$ and performs transmission including a UL-SCH, which has no gaps and starts from a subframe (or slot) $n_0$, in subframes (or slots) $n_0, n_1, \ldots, n_w$ (here, the subframe (or slot) $n_w$ is the most recent subframe (or slot) before a subframe $n_g$-3 in which the UE has transmitted the UL-SCH based on the Type 1 CAP), the reference subframe (or slot) $n_{ref}$ is the subframe no.

(2) Type 2 UL CAP Method

When the UE uses the Type 2 CAP to transmit a UL signal (including a PUSCH) in the unlicensed band, the UE may transmit the UL signal (including the PUSCH) in the unlicensed band immediately after sensing that the channel is idle at least for a sensing duration $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

UL and DL Channel Structures
DL Channel Structure
A BS transmits signals to a UE over the following DL channels. In other words, the UE receives the signals from the BS over the following DL channels.

(1) PDSCH

The PDSCH carries DL data (e.g., DL-shared channel transport block (DL-SCH TB)) and uses a modulation scheme such as quadrature phase shift keying (QPSK), 16-ary quadrature amplitude modulation (16 QAM), 64 QAM, or 256 QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer is mapped to resources together with a demodulation reference signal (DMRS or DM-RS), created as an OFDM symbol signal, and then transmitted through a corresponding antenna port.

(2) PDCCH

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined as one OFDM symbol by one (P)RB.

UL Channel Structure

A UE transmits signal over the following UL channels to a BS. In other words, the BS receives the signals from the UE over the following UL channels.

(1) PUSCH

The PUSCH carries UL data (e.g., UL-shared channel transport block (UL-SCH TB)) and/or UCI and is transmitted based on a CP-OFDM waveform or a DFT-s-OFDM waveform. When the PUSCH is transmitted in the DFT-s-OFDM waveform, the UE transmits the PUSCH by applying transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. PUSCH transmission may be dynamically scheduled by a UL grant in DCI, or semi-statically scheduled by higher-layer (e.g., RRC) signaling (and/or layer 1 (L1) signaling such as a PDCCH) (configured grant). Both codebook based PUSCH transmission and non-codebook based PUSCH transmission may be allowed.

(2) PUCCH

The PUCCH carries UCI, an HARQ-ACK, and/or an SR. Depending on the transmission duration of the PUCCH, the PUCCH is classified into a short PUCCH and a long PUCCH. Table 11 lists exemplary PUCCH formats.

TABLE 11

| PUCCH format | Length in OFDM symbols $N_{symb}^{PUCCH}$ | Number of bits | Usage | Etc |
| --- | --- | --- | --- | --- |
| 0 | 1 2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4 14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI of up to 2 bits and is mapped in a sequence-based manner, for transmission. Specifically, the UE transmits specific UCI to the eNB by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 carries UCI of up to 2 bits and modulation symbols are spread with an orthogonal cover code (OCC) (which is configured differently depending on whether frequency hopping is performed) in the time domain. The DMRS is transmitted in a symbol in which a modulation symbol is not transmitted (i.e., transmitted by time division multiplexing (TDM)).

PUCCH format 2 carries UCI of more than 2 bits and modulation symbols are transmitted by frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBs and carries UCI of more than 2 bits. In other words, PUCCH resources of PUCCH format 3 include no OCC. Modulation symbols are transmitted by TDM with the DMRS.

PUCCH format 4 supports multiplexing of up to 4 UEs in the same PRBs and carries UCI of more than 2 bits. In other words, PUCCH resources of PUCCH format 3 includes an OCC. Modulation symbols are transmitted in TDM with the DMRS.

Random Access in Unlicensed Band

The NR system is intended to support a plurality of logical networks in a single physical system. Accordingly, the NR system is designed to support services with various requirements (e.g., enhanced mobile broadband (eMBB), massive machine type communications (mMTC), ultra-reliable low-latency communication (URLLC), etc.) by changing a transmission time interval (TTI) and/or an OFDM numerology (e.g., OFDM symbol duration, subcarrier spacing, etc.). In recent years, data traffic has significantly increased with the advent of smart devices. Thus, the 3GPP NR system has considered the use of an unlicensed band (U-band) for cellular communication as in License-Assisted Access (LAA) of the legacy 3GPP LTE system. However, unlike the LAA, a NR cell in the U-band (NR U-cell) aims to support standalone operation. For example, PUCCH, PUSCH, and/or PRACH transmission from a UE may be supported.

To support the standalone operation in the U-band, it may be necessary that the UE performs a random access procedure based on PRACH transmission in the U-band. To this end, it may be considered that a series of operations including PRACH transmission/retransmission, RAR reception, Msg3 transmission/retransmission, and Msg4 reception are performed only on a single component carrier (CC) as in a conventional licensed band (L-band). However, considering that operations in the U-band are performed based on radio channel occupation through a CAP (i.e., listen before talk (LBT), clear channel assessment (CCA), etc.), the random access procedure based on the single CC may significantly increase access latency (hereinafter, the CAP, LBT, or CCA may be commonly called the LBT).

In a U-band environment, one CC or bandwidth part (BWP) configured for the UE may be a wideband CC/BWP with a large bandwidth (BW), compared to that in the legacy LTE. When the wideband CC/BWP is configured, a BW that requires CCA based on independent LBT operation may be restricted by on a specific regulation. Accordingly, when a subband unit for performing the independent LBT is defined as an LBT-SB, a plurality of LBT-SBs may be included in one wideband CC/BWP.

The present disclosure proposes a random access procedure based on a plurality of CCs for reducing access latency in a U-band, which is caused by LBT, and UE operations related thereto. The methods proposed in the present disclosure are not limited to a general random access procedure. That is, the methods are similarly applicable to a beam failure recovery procedure (using a PRACH (preamble) signal or an SR (PUCCH) signal) and a request operation for the same. The methods proposed in the present disclosure are not limited to LBT-based U-band operation. That is, the methods are similarly applicable to L-band (or U-band) operations with no LBT. In the following, a plurality of CCs (or a plurality of CC indices) may be replaced with: 1) a plurality of BWPs (or a plurality of BWP indices) configured in one or more CCs or (serving) cells; 2) a plurality of LBT-SBs (or a plurality of LBT-SB indices) configured in one or more CCs or BWPs; or 3) a plurality of CCs/cells/BWPs including a plurality of BWPs or LBT-SBs (i.e., a combination of CCs (CC indices), BWPs (BWP indices), and/or LBT-SB (LBT-SB indices). In this case, the principles/operations of the present disclosure may also be applied in the same manner. In addition, a PRACH or Msg3 may be replaced with an SR signal (e.g., PUCCH), a sounding reference signal (SRS), semi-persistent scheduling (SPS), or a gran-free data signal (e.g., PUSCH). In this case, the principles/operations of the present disclosure (e.g., a method of selecting a CC on which LBT is to be performed, a method of configuring a CC for UL transmission, etc.) may also be applied in the same manner Before describing proposals, parameters and notations used in the random access procedure according to the embodiments of the present disclosure will be defined.

1) Parameter Definition

A. The number of CCs in which a PRACH preamble/resource is configured (e.g., the total number of CCs in a network): N (multiple)

B. The number of CCs on which LBT can be simultaneously performed: K (one or multiple)

C. The number of CCs capable of simultaneous PRACH transmission: L (one or multiple)

D. The number of CCs on which the LBT is successful among the K CCs: M (where K>=M)

2) Notation Definition

A. SS/BCH CC: A CC on which the UE detects/receives an SS and/or a BCH

Hereinafter, an SS/BCH has the same meaning as an SSB or an SS/PBCH.

B. PRACH CC: A CC on which the UE performs PRACH preamble signal transmission

C. RAR CC: A CC on which the UE detects/receives an RAR (PDSCH)

D. Msg3 CC: A CC on which the UE performs Msg3 (PUSCH) transmission

E. Msg4 CC: A CC on which the UE performs Msg4 (PDSCH) reception/detection (1) Step 1: Method of Selecting CC (or CC Group) on which LBT is to be Performed (LBT Target CC (or LBT Target CC Group))

At least one of the following options may be considered for the UE to select the LBT target CC (or CC group) for PRACH transmission.

1) Opt 1-1: CC Group having SS/BCH CC in Center of LBT BW

A. A CC group included in a BW corresponding to the size of a LBT-capable BW (or the number of LBT-SBs corresponding to the LBT-capable BW) with respect to the SS/BCH CC is selected as the LBT target (here, the LBT-capable BW refers to a BW in which LBT can be performed).

For example, a carrier included in the BW corresponding to the LBT-capable BW (or the number of LBT-SBs corresponding to the LBT-capable BW) with respect to an SSB carrier may be the LBT target carrier.

2) Opt 1-2: CC Group Providing Better RSRP (if Detecting Multiple SS/BCH CCs)

A. When the UE detects/receives a plurality of SS/BCH CCs, a CC group including a CC providing the best RSRP or a CC group with the best average RSRP is selected.

3) Opt 1-3: CC Group having the CC with Nearest PRACH Timing

A. A CC group including a CC with a PRACH transmission timing closest to the time at which an SS/BCH is detected/received/decoded is selected.

For example, a CC group including a CC having a predetermined PRACH transmission time closest to the time at which an SSB is detected/received/decoded may be the LBT target.

4) Opt 1-4: Random Selection or Formula Based Selection (at Least One of UE ID, Cell ID, Time Domain Index, or Frequency Domain Index is Used)

A. Among a total of N CCs, K specific CCs are selected in a random way or based on a specific formula.

The random way or formula may be determined as a function of at least one of the following items: a UE ID (e.g., international mobile subscriber identity (IMSI), C-RNTI, etc.), a cell ID, a time domain index (e.g., a slot index configured for PRACH transmission), and a frequency domain index (e.g., a PRB index configured for PRACH transmission).

B. For each of the N CCs, a probability that a corresponding CC is selected as the LBT target (and/or a probability that the PRACH transmission is performed on the corresponding CC) may be configured (through a system information block (SIB)). Thus, the UE may be configured to select the LBT target CC (and/or PRACH transmission target CC) by applying the above probability.

5) Opt 1-5: Configured by RRC (Only for the Purpose of SR after RRC Connection)

A. In the case of connected mode, the LBT target CC group may be configured by (UE-specific) RRC signaling.

6) Opt 1-6: Indicated by PDCCH Order (Candidate CC Group or Random Selection)

A. The LBT target CC group may be indicated through L1 signaling such as PDCCH order. The LBT target CC group may be indicated by a PDCCH, or the application of Opt 1-4 (random selection or formula based selection) may be indicated.

7) Opt 1-7: CC Group having Maximum Number of PRACH-Configured CCs

A. A CC group is selected such that CCs having the PRACH resource thereon are included as many as possible in the LBT-capable BW (or the number of LBT-SBs corresponding to the LBT-capable BW).

8) Opt 1-8: Signaled by UE-Common PDCCH or Signal (Candidate CC Group or Random Selection)

A. The LBT target CC group may be periodically signaled on a specific UE-common channel/signal (e.g., PDCCH, preamble, etc.). The UE may determine the signaled CC group as the LBT target for PRACH transmission before receiving a next UE-common channel signal. The LBT target CC group may be indicated on the UE-common channel/signal, or the application of Opt 1-4 may be indicated.

The following may be considered as an operation performed at, before, or after the time when step 1 is performed.

1) Associated Operation 1

A. PRACH configuration information (i.e., PRACH preamble/resource configuration) about a plurality of CCs (e.g., N CCs) may be provided through the SIB that is transmitted on one SS/BCH CC. The SS/BCH CC may be set to a RSRP (or pathloss estimate) reference CC for a plurality of PRACH-configured CCs. For example, in the case of idle mode, the UE may receive information about LBT target CCs (CCs capable of PRACH transmission) through the SIB.

B. The SS/BCH CC may be set to a PRACH transmission timing reference CC for the plurality of PRACH-configured CCs.

C. In the above and following description, the SS/BCH CC may be replaced with a (initial) DL BWP in which an SS/BCH is transmitted, and the PRACH-configured CC may be replaced with a (initial) UL BWP in which the PRACH resource/transmission is configured/allowed by the SS/BCH CC or DL BWP.

2) Associated Operation 2

A. The LBT target CC group may be selected/configured such that it always includes the SS/BCH CC (i.e., a case in which the PRACH resource is configured on the corresponding CC).

3) Associated Operation 3

A. When LBT fails for all CCS in a CC group (for example, when the energy detection (ED) level is less than or equal to a predetermined value), the LBT may be attempted again while the LBT target CC group is maintained. Otherwise (for example, when the ED level is more than the predetermined value), the LBT may be attempted again after the LBT target CC group is changed.

4) Associated Operation 4

A. When N<=K, all of the N CCs may be determined as the LBT target with no separate selection procedure. That is, only when N>K, the procedure for selecting the LBT target CC or LBT target CC group may be required.

5) Associated Operation 5

A. The LBT capability (e.g., K), i.e., the capability of performing LBT simultaneously, and the UL TX capability (e.g., L), i.e., the capability of performing simultaneous transmission may vary depending on UEs (for example, K>1 and L>1 in UE 1, K>1 and L=1 in UE 2, and K=L=1 in UE 3).

B. Accordingly, considering that the random access procedure in the situation that UEs with different capabilities coexist (in this case, RAR and/or Msg3 varies for each UE), at least one of a sequence generation for configuring a PRACH signal, a frequency index for determining the PRACH resource (and an RA-RNTI value corresponding thereto), a scrambling seed for generating a Msg3 PUSCH signal, or a sequence generation for configuring a Msg3 DMRS may be determined based on the following information.

The index of a frequency resource (e.g., RB) in a total aggregated UL BW (e.g., the total frequency band including the N CCs) where the PRACH preamble/resource is configured (rather than the selected CC(s))

The index of a frequency resource (e.g., RB) in a reference UL BW (which is predetermined by the SIB) including a BW/band where the PRACH preamble/resource is configured (2) Step 2: Method of Selecting CC (or CC Group) on which PRACH is to be Transmitted (PRACH Transmission Target CC (or PRACH Transmission Target CC Group))

At least one of the following options may be considered to select the PRACH transmission target CC (or CC group)) from among CCs where LBT according step 1 is successful.

1) Opt 2-1: According to LBT Result (with Lowest ED Level)

A. Based on the LBT result, CCs with the lowest ED level are selected as the PRACH transmission target.

2) Opt 2-2: Close to SS/BCH CC (CC Providing Similar RSRP to the SS/BCH CC)

A. CCs closed to the SS/BCH CC in the frequency domain are selected as the PRACH transmission target.

For example, if a CC is close to the SS/BCH CC in the frequency domain, the RSRP thereof may be measured similar to that of the SS/BCH CC. Since a CC having similar RSRP to the SS/BCH CC is recognized to be close to the SS/BCH CC, the CC may be the PRACH transmission target CC.

3) Opt 2-3: Based on RSRP (if Detecting Multiple SS/BCH CCs)

A. When the UE detects a plurality of SS/BCH CCs, CCs providing the best RSRP are selected as the PRACH transmission target.

4) Opt 2-4: According to PRACH Resource (with Nearest Timing)

A. A CC with a PRACH transmission timing closest to the time at which the LBT is performed is selected.

5) Opt 2-5: Random Selection or Formula Based Selection

A. Among M CCs where the LBT is successful, L specific CCs are selected in a random way or based on a specific formula. The random way/formula may be determined as a function of at least one of a UE ID, a cell ID, a time domain index, and a frequency domain index.

B. For each CC, a probability that a corresponding CC is selected as the PRACH transmission target may be preconfigured (through the SIB). Thus, the UE may perform the CC selection by applying the above probability.

The following may be considered as an operation performed at, before, or after the time when step 2 is performed.

1) Associated Operation 1

A. The power of a PRACH signal transmitted in the CC group selected by applying the above option may be configured based on the RSRP (or pathloss estimate) of the SS/BCH CC. The PRACH power based on the RSRP (or pathloss estimate) may be commonly configured for all CCs, or depending on the relative position from the SS/BCH CC (in the frequency domain), a power offset may be added (to the PRACH power based on the RSRP (or pathloss estimate)).

B. The starting time of the PRACH signal transmitted in the CC group may be determined with respect to the time at which a DL signal is received on the SS/BCH CC (e.g., slot or symbol boundary).

C. In the above and following description, the SS/BCH CC may be replaced with a (initial) DL BWP in which an SS/BCH is transmitted, and the PRACH transmission target CC may be replaced with a (initial) UL BWP in which the PRACH resource/transmission is configured/allowed by the SS/BCH CC or DL BWP.

2) Associated Operation 2

A. Depending on UE capability (for the value of L), multiple PRACHs may be simultaneously transmitted on multiple CCs. Thereafter, Msg3 may be transmitted on a single CC, or multiple Msg3 may be simultaneously transmitted on multiple CCs.

3) Associated Operation 3

A. When M<=L, all M CCs may be determined as the PRACH transmission target with no separate selection processes. That is, only when M>L, the procedure for selecting the PRACH transmission target CC or PRACH transmission target CC group may be required.

A CC other than the SS/BCH CC may be selected as the PRACH transmission target CC.

(3) Step 3: Method of Selecting CC on which RAR is to be Received (RAR Reception CC)

At least one of the following options may be considered to configure the RAR reception CC for the PRACH transmission in the CC group selected in step 2.

1) Opt 3-1: SS/BCH CC

A. RAR detection/reception may be performed on the SS/BCH CC.

2) Opt 3-2: PRACH CC

A. The RAR detection/reception may be performed on the PRACH CC.

3) Opt 3-3: Pre-Configured by SIB or RRC (Paring between PRACH CC and RAR CC)

A. Information about the PRACH CC and RAR CC related thereto (or a candidate RAR CC group) may be preconfigured by the SIB or RRC (signaling).

4) Opt 3-4: Indicated by PDCCH Order (RAR CC or Candidate CC Group)

A. Information about the RAR reception CC or candidate RAR CC group available for the RAR reception may be indicated by L1 signaling such as PDCCH order.

5) Opt 3-5: Try to Detect RAR over Multiple CCs (Including SS/BCH CC or PRACH CC)

A. The RAR detection/reception may be performed in a specific CC group including multiple CCs (or a random CC in the CC group). The CC group may be configured to at least include the SS/BCH CC and/or PRACH CC.

The following may be considered as an operation performed at, before, or after the time when step 3 is performed.

1) Associated Operation 1

A. When a CC group, i.e., a plurality of CCs are set to the RAR reception CC according to the above option, the UE may be configured to attempt to detect/receive the RAR (and a PDCCH scheduling the RAR) on the plurality of CCs.

2) Associated Operation 2

A. The index of the PRACH CC may be transmitted over an RAR PDSCH (e.g., in the form of a MAC header (or MAC sub-header)) or indicated by a PDCCH related to the RAR. The RA-RNTI value may be determined based on the PRACH CC index.

A CC other than the SS/BCH CC or PRACH CC may be selected as the RAR CC.

(4) Step 4: Method of Selecting CC on which PRACH is to be Retransmitted (PRACH Retransmission CC) (Including LBT Target CC)

At least one of the following options may be considered to select the PRACH retransmission CC (and the LBT target CC therefor) (i) when the RAR reception on the CC selected in step 3 fails, (ii) when Msg4 detection fails in spite of Msg3 transmission/retransmission, or (iii) when contention resolution (CR) fails in spite of Msg4 reception.

1) Opt 4-1: Keep Initial PRACH CC (or CC Group Including the CC)

A. A CC on which (initial) PRACH transmission was performed is selected as the PRACH retransmission CC (and LBT target CC).

2) Opt 4-2: Change to Different CC (Group) from Initial PRACH CC (Group)

A. A CC (or CC group) different from the CC (or CC group) on which the (initial) PRACH transmission was performed is selected as the PRACH retransmission CC (and LBT target CC).

3) Opt 4-3: Just go to Step 1/2 in above

A. The PRACH retransmission CC (and LBT target CC) is selected by applying step 1 or 2.

4) Opt 4-4: Try LBT for Initial PRACH CC (Group) then Apply Opt 4-2 or Opt 4-3 if LBT is Failed A. The LBT is attempted for the CC (or CC group) on which the (initial) PRACH transmission was performed. If the LBT is successful, Opt 4-1 is applied. Otherwise, Opt 4-2 or 4-3 is applied.

The following may be considered as an operation performed at, before, or after the time when step 4 is performed.

1) Associated Operation 1

A. When the CC on which the (initial) PRACH transmission was performed is selected as the retransmission CC according to the above option, the value of a PRACH transmission counter increases. On the contrary, when a CC other than the CC on which the (initial) PRACH transmission was performed is selected as the retransmission CC, the value of the PRACH transmission counter does not increase (alternatively, the PRACH transmission counter may be managed independently for each CC).

The PRACH transmission counter counts the number of times that the PRACH is transmitted, i.e., the number of transmitted RACH preambles. The PRACH transmission counter starts from 1 and increases by 1 whenever the PRACH is transmitted. The UE may receive the maximum value of the PRACH transmission counter from higher layers. When the value of the PRACH transmission counter is less than the maximum value, the PRACH may be transmitted. When the value of the PRACH transmission counter reaches the maximum value, the PRACH is no longer transmitted. In this case, it may be determined that there is a problem in the random access procedure.

2) Associated Operation 2

A. When the CC on which the (initial) PRACH transmission was performed is selected as the retransmission CC according to the above option, the PRACH power is ramped up. On the contrary, when a CC other than the CC on which the (initial) PRACH transmission was performed is selected as the retransmission CC, the PRACH power may not be ramped up (alternatively, the PRACH power ramping may be managed independently for each CC).

3) Associated Operation 3

A. When the CC on which the (initial) PRACH transmission was performed is selected as the retransmission CC according to the above option, a contention window size (CWS) may increase. On the contrary, when a CC other than the CC on which the (initial) PRACH transmission was performed is selected as the retransmission CC, any one of the following operations may be performed: (i) the CWS increases, (ii) the CWS is maintained with no increase, and (iii) the CWS is initialized may be performed (alternatively, the CWS may be managed independently for each CC).

The CWS may be (a) a CWS (corresponding to the maximum number of selectable CCA slots) for selecting the number of CCA slots where the LBT operation is to be performed (in a random manner) and/or (b) a CWS (corresponding to the total number of candidate PRACH resources available for selection) for selecting PRACH retransmission resources (in a random manner).

According to the above operation, a CC other than the CC on which the (initial) PRACH transmission was performed may be selected as the PRACH retransmission CC.

(5) Step: Method of Configuring CC on which Msg3 is to be Transmitted (Msg3 Transmission CC) (Including LBT)

At least one of the following options may be considered to configure the Msg3 transmission CC (and LBT target CC therefor) when the RAR detection/reception on the CC selected in step 3 is successful.

1) Opt 5-1: SS/BCH CC

A. The SS/BCH CC is set to the Msg3 transmission CC (and LBT target CC).

2) Opt 5-2: PRACH CC

A. The PRACH CC is set to the Msg3 transmission CC (and LBT target CC).

3) Opt 5-3: RAR CC

A. The RAR CC is set to the Msg3 transmission CC (and LBT target CC).

4) Opt 5-4: Pre-Configured by SIB or RRC (Paring between PRACH CC and Msg3 CC)

A. Information about the PRACH CC and Msg3 CC related thereto (or a candidate Msg3 CC group) may be preconfigured by the SIB or RRC (signaling).

5) Opt 5-5: Indicated by RAR (Msg3 CC or Candidate CC Group)

A. Information about the Msg3 CC (or candidate Msg3 CC group) may be indicated by the RAR (or PDCCH related thereto).

6) Opt 5-6: Try to Transmit Msg3 over Multiple CCs (Including SS/BCH CC or PRACH CC or RAR CC)

A. When the UE performs the LBT for a specific CC group including multiple CCs, Msg3 may be transmitted over one or more random CCs in the CC group. The CC group may be configured to include at least one of the SS/BCH CC, PRACH CC, and RAR CC.

The following may be considered as an operation performed at, before, or after the time when step 5 is performed.

1) Associated Operation 1

A. When a CC group, i.e., a plurality of CCs are set to the Msg3 transmission CC (and LBT target CC) according to the above option, the UE may be configured to perform the LBT on the plurality of CCs. When the LBT is successful, the UE may be configured to configure the Msg3 transmission CC according to step 2 (for example, by applying Opt 2-1 or 2-5 in step 2).

2) Associated Operation 2

A. The index of the PRACH CC and/or the index of the RAR CC may be transmitted in Msg3 (PUSCH). Depending on the PRACH CC index and/or RAR CC index, parameters used for configuring the Msg3 PUSCH signal (e.g., cyclic shift and/or OCC sequence for DMRS, data/DMRS scrambling parameter (ID) for PUSCH, etc.) may vary.

A CC other than the SS/BCH CC, PRACH CC, or RAR CC may be selected as the Msg3 CC.

(6) Step 6: Method of Configuring CC on which Msg3 is to be Retransmitted (Msg3 Retransmission CC) (Including LBT Target CC)

At least one of the following options may be considered to configure the Msg3 retransmission CC (and LBT target CC therefor) when Msg4 detection/reception fails after Msg3 is transmitted on the CC selected in step 5.

1) Opt 6-1: Keep Initial Msg3 CC (or CC Group Including the CC)

A. A CC (or CC group) on which (initial) Msg3 transmission was performed is selected as the Msg3 retransmission CC (and LBT target CC).

2) Opt 6-2: Change to Different CC (Group) from Initial Msg3 CC (Group)

A. A CC (or CC group) different from the CC (or CC group) on which the (initial) Msg3 transmission was performed is selected as the Msg3 retransmission CC (and LBT target CC).

3) Opt 6-3: Just go to Step 5 in above

A. The Msg3 retransmission CC (and LBT target CC) is selected by applying step 5.

4) Opt 6-4: Try LBT for Initial Msg3 CC (Group) then Apply Opt 6-2 or Opt 6-3 if LBT is Failed A. The LBT is attempted for the CC (or CC group) on which the (initial) Msg3 transmission was performed. If the LBT is successful, Opt 6-1 is applied. Otherwise, Opt 6-2 or 6-3 is applied.

The following may be considered as an operation performed at, before, or after the time when step 6 is performed.

1) Associated Operation 1

A. Considering the characteristics of the LBT-based U-band operation, it may be efficient to retransmit Msg3 in a grant-less manner Specifically, if Msg4 is not detected for a predetermined duration (e.g., X slots) after Msg3 is transmitted, Msg3 may be retransmitted (without UL grant transmission/detection).

B. The (grant-less) Msg3 retransmission with a periodicity of X slots may be allowed at most N times. If Msg4 is not detected while Msg3 is retransmitted N times, the UE may be configured to retransmit the PRACH.

C. Information about slots in which the (grant-less) Msg3 retransmission is allowed or a pattern thereof (e.g., at least one of the value of X, the value of N, and the frequency of Msg3 transmission (e.g., CC/RB resource) in each slot) may be indicated by the RAR (and/or SIB).

D. Resource information about initially transmitted Msg3 (PUSCH) (e.g., CC index, slot index, etc.) may be included and transmitted in retransmitted Msg3 (PUSCH). Alternatively, the resource information may be indicated by the parameters used for configuring the Msg3 (PUSCH) signal (e.g., cyclic shift and/or OCC sequence for DMRS, data/DMRS scrambling parameter (ID) for PUSCH, etc.).

A CC other than the CC on which the (initial) Msg3 transmission was performed may be selected as the Msg3 retransmission CC.

(7) Step 7: Method of Configuring CC in which Msg 4 is to be Received (Msg4 Reception CC)

At least one of the following options may be considered to configure the Msg4 reception CC after Msg3 is transmitted on the CC selected in step 5/6.

1) Opt 7-1: SS/BCH CC

A. Msg4 detection/reception may be performed on the SS/BCH CC.

2) Opt 7-2: PRACH CC

A. The Msg4 detection/reception may be performed on the PRACH CC.

3) Opt 7-3: RAR CC

A. The Msg4 detection/reception may be performed on the RAR CC.

4) Opt 7-4: Msg3 CC

A. The Msg4 detection/reception may be performed on the Msg3 CC.

5) Opt 7-5: Pre-Configured by SIB or RRC (Paring between PRACH CC and Msg4 CC)

A. Information about the PRACH CC and Msg4 CC related thereto (or a candidate Msg4 CC group) may be preconfigured by the SIB or RRC signaling.

6) Opt 7-6: Indicated by RAR (Msg4 CC or Candidate CC Group)

A. Information about a CC on which Msg4 is to be transmitted (or a CC group on which Msg4 is to be transmitted) may be indicated by the RAR (or PDCCH related thereto).

7) Opt 7-7: Try to Detect Msg4 over Multiple CCs (Including SS/BCH or PRACH or RAR or Msg3 CC)

A. The Msg4 detection/reception may be performed in a specific CC group including multiple CCs (or a random CC in the CC group). The CC group may be configured to include at least one of the SS/BCH CC, PRACH CC, RAR CC, and Msg3 CC.

The following may be considered as an operation performed at, before, or after the time when step 7 is performed.

1) Associated Operation 1

A. When a CC group, i.e., a plurality of CCs are set to the Msg4 reception CC according to the above option, the UE may be configured to attempt to detect/receive Msg4 (and a PDCCH scheduling Msg4) on the plurality of CCs.

2) Associated Operation 2

A. The index of the PRACH CC and/or the index of the Msg3 CC may be included and transmitted in Msg4 (PDSCH). Alternatively, the PRACH CC index and Msg3 index may be indicated by the PDCCH related to Msg4.

A CC other than the SS/BCH CC, PRACH CC, RAR CC, or Msg3 CC may be selected as the Msg4 CC.

Additionally, the following may be considered as CC combinations accompanied in the RACH procedure (random access procedure).

1) Combination 1

A. All of the PRACH CC, RAR CC, Msg3 CC, and Msg4 CC are configured to be the same, but the CC on which the (initial) PRACH transmission was performed may be configured to be different from the PRACH retransmission CC.

2) Combination 2

A. The RAR CC, Msg4 CC, and Msg4 CC are configured to be the same, but the PRACH CC may be configured to be different from the RAR CC.

3) Combination 3

A. The PRACH CC and RAR CC are configured to be the same, and the Msg3 CC and Msg4 CC are configured to be the same. The PRACH CC and Msg3 CC may be configured to be different.

4) Combination 4

A. The PRACH CC and Msg3 CC may be configured to be the same, and the RAR CC and Msg4 CC may be configured to be the same. The PRACH CC and RAR CC may be configured to be different.

5) Combination 5

A. The CC on which the (initial) PRACH transmission was performed and the PRACH retransmission CC may be determined to be different from each other, whereas the CC on which the (initial) Msg3 transmission was performed and the Msg3 retransmission CC may be configured to be the same. However, a BWP in which Msg3 is transmitted/retransmitted on the Msg3 CC may vary between the (initial) transmission and retransmission.

The proposed methods may be applied equally/similarly when N=1, that is, when the number of CCs/BWPs in which the PRACH preamble/resource is configured is 1 (based on that, the proposed methods may be applied equally/similarly when M=1, that is, when the number of CCs/BWPs in which LBT is successful is 1 as in when the number of PRACH-configured CCs/BWPs is 1).

(8) Msg3 Transmission Based on Multiple Candidate Resources

In the U-band operation, since LBT failure may occur in the RACH procedure (and signal transmission may be dropped due to the LBT failure), it may be considered that a plurality of candidate resources are allocated/configured in the time and frequency domain (by an RAR and/or SIB) and a UE performs Msg3 (PUSCH) transmission on a specific one resource where LBT is successful among the plurality of candidate resources. For example, a plurality of candidate resources time division multiplexed (TDM) in the time domain (e.g., slots, symbol groups, etc.) may be configured for a single Msg3 transmission. The UE may attempt the LBT on the corresponding resources in chronological order and transmit Msg3 on a resource where the UE succeeds in CCA first. As another example, a plurality of candidate resources separated in the frequency domain (e.g., LBT-SBs, BWPs, CCs, etc.) may be configured for a single Msg3 transmission. The UE may attempt the LBT on the plurality of (frequency) resources and transmit Msg3 on a specific (frequency) resource where the UE succeeds in the CCA.

In the L-band operation, it may be considered that a plurality of candidate resources are allocated/configured in the time and frequency domain (by an RAR and/or SIB) and a UE performs Msg3 (PUSCH) transmission on a specific one resource that is randomly selected from among the corresponding resources or selected based on the size of UL data, the (global) ID of the UE, etc.

When the UE transmits Msg3 while being allocated/configured with multiple candidate as described above, a gNB receiver may simultaneously detect a plurality of Msg3 signals (from different UEs) from a plurality of different candidate resources (allocated for Msg3 transmission) corresponding to one RAR. When a gNB detects Msg3 signals from multiple UEs for one RAR, if the conventional method is applied, only one specific UE among the multiple UEs may succeed in establishing an RRC connection by receiving Msg4 (PDSCH). That is, other non-selected UEs may restart from PRACH transmission even if the gNB correctly detects the Msg3 signals. In addition, in the case of the U-band operation, since the LBT operation (and CCA success based thereon) is required for all signal transmission steps, it may be unnecessary and inefficient.

Thus, if a plurality of Msg3 signals are detected for one RAR, multiple UEs that transmit the plurality of Msg3 signals need to have access in consideration of efficiency in the resource and latency. The following methods may be considered to allow multiple Msg3 transmission UEs to have access.

1) Whether a TC-RNTI is used as a C-RNTI or a different value from the TC-RNTI is allocated as the C-RNTI may be indicated to the UE by Msg4 (PDSCH).

A. An additional TA command may be indicated by Msg4 (in addition to a TA, which was indicated before by the RAR). Accordingly, the UE may be configured to update the TA based on the corresponding command and perform HARQ-ACK PUCCH transmission for Msg4 reception by applying the updated TA.

2) Even if a UE ID included in Msg4, which was successfully decoded (before the expiration of a CR timer), is different from the ID of the UE, the UE may be configured to monitor Msg4 until the expiration of the CR timer.

A. The number of remaining Msg4 transmissions (to be scheduled/transmitted with the same TC-RNTI) or information about candidate resources where Msg3 is detected (or the indices thereof) may be indicated to the UE by Msg4.

B. To reduce the decoding load of the UE for the Msg4 PDSCH, the information (e.g., the indices of the candidate resources where Msg3 is detected) may be indicated by a DCI field in a TC-RNTI based PDCCH scheduling Msg4.

3) A different TC-RNTI may be allocated to each of a plurality of candidate Msg3 resources corresponding to one RAR.

A. Thus, the UE may be configured to monitor only a TC-RNTI (PDCCH) corresponding to a candidate resource which was selected/transmitted by the UE.

4) If one UE repeatedly transmits Msg3 on a plurality of candidate resources, the UE may be configured to continuously monitor Msg4 (PDCCH) corresponding to the number/indices of the plurality of resources.

Additionally, in the above situation, Msg3 (PUSCH) retransmission may need to be scheduled/indicated for each candidate resource in terms of efficiency. To this end, it may be considered that UL grant DCI for Msg3 retransmission indicates a candidate resource on which Msg3 transmission is performed and the retransmission thereof is scheduled.

Figure 16:
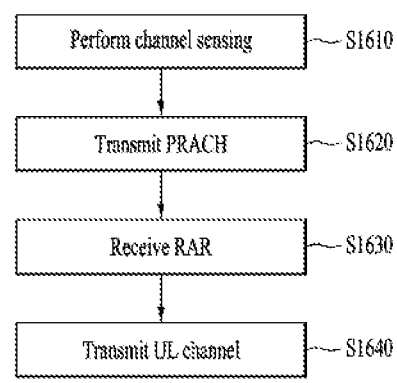
FIGS. 16 and 17 are diagrams illustrating a random access procedure to which the embodiments of the present disclosure are applied.
Figure 17:
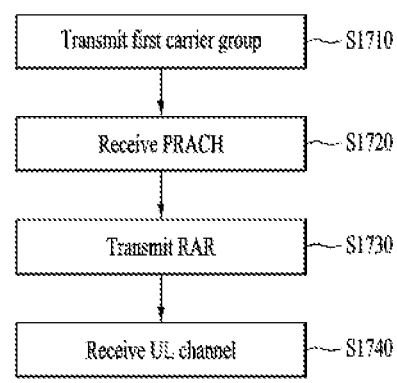

FIGS. 16 and 17 illustrate a random access procedure to which the embodiments of the present disclosure are applied.

Referring to FIG. 16, a UE may perform LBT, i.e., channel sensing (S1610). In this case, the UE may perform the channel sensing in consideration of its UE capability. The channel sensing may be performed on a carrier group (first carrier group) including one or more carriers. In the case of idle mode, the first carrier group may be configured/indicated by system information in an SSB. In the case of connected mode, the first carrier group may be configured/indicated by DCI transmitted on a PDCCH. In addition, the UE may obtain information about a PRACH resource from the system information or DCI. Step S1610 is related to the method of selecting a LBT target CC (or CC group) described above in step 1.

Based on channel sensing results, the UE may transmit a PRACH on at least one carrier in the first carrier group (S1620). Step S1620 is related to the method of selecting a PRACH transmission target CC (or CC group) described above in step 2.

In response to the PRACH transmission, the UE may receive an RAR on at least one carrier in a second carrier group (S1630). The second carrier group may be equal to or different from the first carrier group. Step S1630 is related to the method of configuring an RAR reception CC described above in step 3.

The UE may transmit a UL channel (e.g., PUSCH) based on the RAR (S1640). Step S1640 is related to the method of configuring a Msg3 transmission CC described above in step 5.

In the case of contention-based random access, the UE may transmit Msg3 as the uplink channel and receive a contention resolution message (Msg4) from a BS in response to Msg3.

Referring to FIG. 17, a BS may transmit information about a first carrier group to a UE (S1710). The first carrier group may include one or more carriers, and channel sensing may be performed thereon. In the case of idle mode, the first carrier group may be configured/indicated by system information transmitted in an SSB. In the case of connected mode, the first carrier group may be configured/indicated by DCI transmitted on a PDCCH. In addition, the system information or DCI may carry information about a PRACH resource.

When the BS receives a PRACH for at least one carrier in a second carrier group from the UE (S1720), the BS transmits an RAR in response to the PRACH (S1730). The RAR may be transmitted on at least one CC in the second carrier group.

The BS may receive a UL connection channel from the UE (S1740).

By doing so, LBT for a plurality of carrier groups and random access may be performed in a U-band.

(9) SR Transmission Related Operation in U-Band

For SR transmission in the conventional L-band system, an SR transmission timing, an SR transmission period, and an SR PUCCH resource are preconfigured by RRC signaling.

FIG. 18(a) is a diagram illustrating SR transmission in an L-band system, and FIG. 18(b) is a diagram illustrating a U-band system to which the embodiment of the present disclosure is applied.

A UE may transmit an SR PUCCH configured at an SR transmission timing closest to the time at which a positive SR is triggered. Whenever the UE performs SR transmission, the value of an SR transmission counter (or SR counter) increases. At the SR transmission timing, the value of an SR prohibit timer is reset, and the SR prohibit timer starts to operate. Until the expiration of the SR prohibit timer (e.g., until the SR prohibit timer reaches a maximum value), the SR transmission may be dropped.

Referring to FIG. 18(a), the UE may transmit the SR on a resource configured for the SR transmission (e.g., PUCCH) at a predetermined time (1801). If there are no resources configured for the SR transmission, the UE may initiate a random access procedure. When the SR is transmitted (1801), the SR counter increases by 1 and the SR prohibit timer starts to operate after being reset (1802). While the SR prohibit timer operates, no SR transmission is performed. When the operation of the SR prohibit timer is terminated, that is, when the SR prohibit timer reaches a predetermined value (maximum value), a next SR is transmitted (1803). In this case, the SR counter increases by 1 and the SR prohibit timer starts to operate again after being reset (1804). The SR counter reaches a predetermined specific value (e.g., dsr-TransMax), the UE may initiate the random access procedure without performing the SR transmission. The value of dsr-TransMax and the value of the SR prohibit timer for stopping the SR transmission may be included in RRC signaling or configured based on information included in the RRC signaling.

The purpose of the SR counter and SR prohibit counter is to 1) prevent the UE from performing the SR transmission too many times and 2) prevent the UE from initiating the random access procedure easily when the SR counter quickly reaches dsr-TransMax.

Similar configurations and UE operations may be considered in the U-band system. Specifically, in a U-band environment, a UE may perform SR transmission in consideration of LBT. To this end, it needs to be discussed how to manage the SR counter and SR prohibit counter when the UE fails in the LBT at a configured SR transmission timing in the state that a positive SR is triggered.

Referring to FIG. 18(b), if the UE has a resource capable of transmitting an SR after performing the LBT, the UE transmits the SR (1811). In addition, the SR counter increases by 1, and the SR prohibit timer starts to operate (1812). While the SR prohibit timer operates, no SR transmission is performed. In the conventional L-band system, when the SR prohibit timer reaches a predetermined value, that is, when the operation of the SR prohibit timer is terminated, if the value of the SR counter is less than the value of dsr-TransMax, the SR transmission may be reinitiated at all times. However, in the U-band system, if the UE fails in occupying a resource available for the SR transmission based on LBT results, the UE may not transmit any SR. That is, it needs to be discussed how the values of the SR counter and SR prohibit counter are processed if the UE transmits no SR at time 1813 due to LBT failure. To this end, the present disclosure proposes the following three options.

1) Opt 9-1: No Increase of SR Counter+No Reset of SR Prohibit Timer

A. The SR counter does not increase, and the SR prohibit timer is not reset.

B. According to this option, the SR prohibit timer is not reset at time 1813 in spite of the LBT failure, but the SR prohibit timer keeps the predetermined value (maximum value). In this case, the UE attempts the SR transmission (and the LBT operation therefor) again at an SR-configured timing closest to the time at which the UE fails in the LBT, thereby minimizing SR transmission latency. Further, the option may prevent the UE from performing the random access (RACH) procedure at an early stage when the SR counter quickly reaches drs-TransMax.

2) Opt 9-2: Increase of SR Counter+No Reset of SR Prohibit Timer

A. The SR counter increases, and the SR prohibit timer is not reset.

B. According to this option, the SR prohibit timer operates in the same way as in Opt 9-1, thereby minimizing the SR transmission latency, and at the same time, the SR counter increases in the case of the LBT failure, thereby enabling the UE to transition to the random access (RACH) procedure with no unnecessary latency when there is high interference.

3) Opt 9-3: Increase of SR Counter+Reset of SR Prohibit Timer

A. The SR counter increases, and the SR prohibit timer is reset.

B. According to this option, when the LBT fails (and the SR transmission is dropped due to the LBT failure), the SR counter and SR prohibit timer operate in the same way as when the SR transmission is normally performed, thereby managing the number of SR transmission opportunities/frequencies and the time of transitioning to the RACH procedure in the almost same way as in the conventional L-band environment.

Additionally, when the UE fails in the LBT at the (configured) SR transmission timing, the expiration value (maximum value) of the SR prohibit timer may be reduced. In the above description, 'resetting' may mean that the SR prohibit timer is initialized and restarts from an initial value, and 'non-resetting' may mean that the SR prohibit timer is not initialized and does not restarts (e.g., the maximum value of the SR prohibit timer is maintained).

In Opt 9-1, since the SR (PUCCH) transmission is dropped at time 1813 due to the UE's LBT failure, it may be considered that the SR counter does not increase. However, if the SR counter is continuously maintained with no increase even though the UE keeps failing in the LBT over a plurality of SR timings, the UE may not transition to the RACH procedure at a proper time. Thus, when the UE (continuously) fails in the LBT over a plurality of (consecutive) SR transmission timings corresponding to a specific number (e.g., M, where M>1) of SR transmission timings or a specific time duration, the following UE operations may be performed.

The SR counter increases (for example, when the UE fails in the LBT for all of the M consecutive SR transmission timings, the SR counter increases by 1).

The UE transitions to the RACH process (regardless of the value of the SR counter).

The UE informs its higher layer of the LBT failure.

The UE declares radio link failure (RLF).

In the U-band environment, since the SR (PUCCH) transmission may be dropped due to the LBT failure of the UE, it may be configured that the SR transmission timing is periodically configured with a specific period and a plurality of (TDM) candidate SR transmission (PUCCH) resources (a candidate SR resource set) are configured for each SR transmission timing. The UE may be configured to perform the LBT step by step for a plurality of candidate SR (PUCCH) resources configured for one SR transmission timing and transmit SR information on a resource where the UE first succeeds in the LBT (or on all of the resources configured after the corresponding resource in time including the corresponding resource). When the UE (continuously) fails in the LBT over a plurality of (consecutive) SR transmission timings corresponding to a specific number (e.g., M, where M>1) of SR transmission timings or a specific time duration similar to the above or when the UE (continuously) fails in the LBT over a specific number (e.g., L, where L>1) of (consecutive) candidate SR resources, the UE may be configured to increase the SR counter or transition to the RACH procedure (alternatively, the UE may be configured to inform its higher layer of the corresponding results or declare the RLF).

(10) SRS Switching Related Operation in U-Band

According to the SRS switching operation in the conventional L-band system, a UE may stop UL transmission on a source CC and perform SRS transmission on a target CC through frequency tuning. Then, the UE may reinitiate the UL transmission by switching back to the source CC through frequency retuning. Since there is a limitation on the UL CA capability of the UE, the UE may perform the SRS switching operation by setting a DL only CC to the target CC to achieve fast DL CSI acquisition based on channel reciprocity in TDD.

Similar configurations and UE operations may be considered in the U-band system. In this case, depending on whether the UE succeeds or fails in the LBT for the target CC, the interruption time and resource efficiency on the source CC may vary. In the present disclosure, the following operation/configuration methods are proposed.

1) SRS Switching UE Operation

A. When the UE succeeds in the LBT for the target CC, the UE may switch to the source CC after performing the SRS transmission on the target CC. When the UE fails in the LBT for the target CC, the UE may switch to the source CC with no SRS transmission (by dropping the SRS transmission on the target CC).

2) SRS Switching Configuration

A. A plurality of LBT timings may be configured for the SRS transmission on the target CC (that is, the LBT may be performed multiple times) and/or a plurality of candidate SRS symbols may be configured. The UE may be configured to switch to the source CC after performing the SRS transmission at the time when the UE first succeeds in the LBT (with no addition LBT operation).

Devices Used in Wireless Communication System

Figure 19:
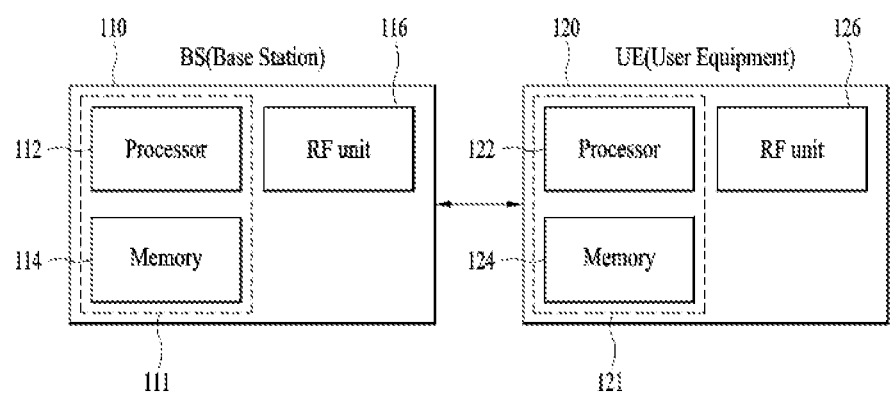
FIG. 19 is a diagram illustrating a BS and a UE applicable to the present disclosure.

FIG. 19 illustrates a BS and a UE applicable to the present disclosure.

Referring to FIG. 19, a wireless communication system may include a BS 110 and a UE 120. When the wireless communication includes a relay, the BS or UE may be replaced with the relay.

The BS 110 may include a processor 112, a memory 114, and a radio frequency (RF) unit 116. The processor 112 may be configured to perform the described/proposed procedures and methods by controlling the memory 114 and/or the RF unit 116. For example, the processor 112 may generate first information and/or a first signal by processing information in the memory 114 and then control the RF unit 116 to transmit a radio signal containing the first information/signal. The processor 112 may control the RF unit 116 to receive a radio signal containing second information and/or a second signal and then control the memory 114 to store information obtained by processing the second information/signal. The processor 112 may include a communication modem designed suitable for a wireless communication technology (e.g., LTE, NR, etc.). The memory 114 may be connected to the processor 112 and configured to store various information on the operations of the processor 112. For example, the memory 114 may store software code including commands for performing some or all of the processes controlled by the processor 112 or the described/proposed procedures and methods. The RF unit 116 may be connected to the processor 112 and configured to transmit and/or receive a radio signal. The RF unit 116 may include a transmitter and/or a receiver. The RF unit 116 may be replaced with a transceiver. The processor 112 and the memory 114 may be included in a processing chip 111 (e.g., system on chip (SOC)).

The UE 120 may include a processor 122, a memory 124, and an RF unit 126. The processor 122 may be configured to perform the described/proposed procedures and methods by controlling the memory 124 and/or the RF unit 126. For example, the processor 122 may generate third information or a third signal by processing information in the memory 124 and then control the RF unit 126 to transmit a radio signal containing the third information/signal. The processor 122 may control the RF unit 126 to receive a radio signal containing fourth information or a fourth signal and then control the memory 124 to store information obtained by processing the fourth information/signal. The processor 122 may include a communication modem designed suitable for a wireless communication technology (e.g., LTE, NR, etc.). The memory 124 may be connected to the processor 122 and configured to store various information on the operations of the processor 122. For example, the memory 124 may store software code including commands for performing some or all of the processes controlled by the processor 122 or the described/proposed procedures and methods. The RF unit 126 may be connected to the processor 122 and configured to transmit and/or receive a radio signal. The RF unit 126 may include a transmitter and/or a receiver. The RF unit 126 may be replaced with a transceiver. The processor 122 and the memory 124 may be included in a processing chip 121 (e.g., system on chip (SOC)).

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

The invention claimed is:

1. A method of transmitting a Physical Uplink Shared Channel (PUSCH) by a user equipment (UE) in a wireless communication system, the method comprising:
performing a first sensing on at least one Resource Block (RB) set;
transmitting, through a RB set of the at least one RB set, a Physical Random Access Channel (PRACH) based on the RB set being sensed to be idle by the first sensing;
receiving a Random Access Response (RAR) Uplink (UL) grant associated with the PRACH;
performing a second sensing on the RB set;
transmitting, through the RB set, a PUSCH scheduled by the RAR UL grant based on the RB set being sensed to be idle by the second sensing.

2. The method of claim 1, wherein the RB set includes a plurality of RBs.

3. The method of claim 1, wherein the UE accesses the RB set based on at least one of the first sensing and the second sensing according to UL channel access procedure.

4. The method of claim 1, wherein the first sensing and the second sensing are performed based on Listen-before-Talk (LBT) operation.

5. The method of claim 1, wherein the RAR UL grant is received through a Physical Downlink Shared Channel (PDSCH).

6. A non-transitory medium which is readable by a processor and storing instructions cause the processor to perform the method of claim 1.

7. An apparatus of transmitting a Physical Uplink Shared Channel (PUSCH) in a wireless communication system, the apparatus comprising:
at least one processor; and
at least one computer memory operably connectable to the at least one processor and storing instructions that, when executed, cause the at least one processor to perform operations comprising:
performing a first sensing on at least one Resource Block (RB) set;
transmitting, through a RB set of the at least one RB set, a Physical Random Access Channel (PRACH) based on the RB set being sensed to be idle by the first sensing;
receiving a Random Access Response (RAR) Uplink (UL) grant associated with the PRACH;
performing a second sensing on the RB set;
transmitting, through the RB set, a PUSCH scheduled by the RAR UL grant based on the RB set being sensed to be idle by the second sensing.

8. The apparatus of claim 7, wherein the RB set includes a plurality of RBs.

9. The apparatus of claim 7, wherein the apparatus accesses the RB set based on at least one of the first sensing and the second sensing according to UL channel access procedure.

10. The apparatus of claim 7, wherein the first sensing and the second sensing are performed based on Listen-before-Talk (LBT) operation.

11. The apparatus of claim 7, wherein the RAR UL grant is received through a Physical Downlink Shared Channel (PDSCH).

12. The apparatus of claim 7, the apparatus further comprising:
at least one transceiver.

* * * * *